(12) United States Patent
Silverstein

(10) Patent No.: US 7,559,653 B2
(45) Date of Patent: Jul. 14, 2009

(54) STEREOSCOPIC DISPLAY APPARATUS USING LCD PANEL

(75) Inventor: Barry D. Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 490 days.

(21) Appl. No.: 11/302,824

(22) Filed: Dec. 14, 2005

(65) Prior Publication Data

US 2007/0132953 A1   Jun. 14, 2007

(51) Int. Cl.
*G03B 21/00* (2006.01)
*G03B 21/26* (2006.01)

(52) U.S. Cl. ................ 353/7; 353/30; 353/31
(58) Field of Classification Search ........ 353/7, 353/20, 31, 33, 34, 37, 30; 349/5–8; 348/742, 348/743, 771
See application file for complete search history.

(56) References Cited

U.S. PATENT DOCUMENTS

| 5,729,245 | A | 3/1998 | Gove et al. |
|---|---|---|---|
| 5,758,940 | A | 6/1998 | Ogino et al. |
| 5,798,819 | A | 8/1998 | Hattori et al. |
| 5,808,795 | A | 9/1998 | Shimomura et al. |
| 5,889,614 | A | 3/1999 | Cobben et al. |
| 5,918,961 | A | 7/1999 | Ueda |
| 6,010,221 | A | 1/2000 | Maki et al. |
| 6,034,818 | A | 3/2000 | Sedlmayr |
| 6,062,694 | A | 5/2000 | Oikawa et al. |
| 6,113,239 | A | 9/2000 | Sampsell et al. |
| 6,231,192 | B1 | 5/2001 | Konno et al. |
| 6,280,034 | B1 | 8/2001 | Brennesholtz |
| 6,452,724 | B1 | 9/2002 | Hansen et al. |
| 6,505,940 | B1 | 1/2003 | Gotham et al. |
| 6,513,932 | B1 | 2/2003 | Ehrne et al. |
| 6,585,378 | B2 | 7/2003 | Kurtz et al. |
| 6,637,888 | B1 | 10/2003 | Haven |
| 6,676,260 | B2 | 1/2004 | Cobb et al. |
| 6,739,723 | B1 | 5/2004 | Haven et al. |

(Continued)

FOREIGN PATENT DOCUMENTS

EP    890 863    1/1999

OTHER PUBLICATIONS

Dewald et al.; "Sequential Color Recapture and Dynamic Filtering: A Method of Scrolling Color" SID 01 Digest, pp. 1076-1079.

*Primary Examiner*—Hung Henry Nguyen
(74) *Attorney, Agent, or Firm*—Nelson Blish

(57) ABSTRACT

A stereoscopic imaging apparatus (200) has an illumination source (110) providing polarized illumination beams and at least one uniformizing element (22) for uniformizing first and second illumination beams. A left channel modulation apparatus (220*l*) modulates the first polarized illumination beam to provide the left eye portion of the stereoscopic image and a right channel modulation apparatus (220*r*) modulates the second polarized illumination beam to provide the right eye portion. Each channel modulation apparatus has a color separator (78) for separating the polarized illumination beam into at least a first component wavelength illumination and a second component wavelength illumination. Each channel modulation apparatus also has at least two component wavelength modulating sections, each component wavelength modulating section being a portion of a monochrome transmissive liquid crystal modulator panel (60) that accepts a corresponding component wavelength illumination and modulates the component wavelength illumination to provide a modulated component wavelength beam.

48 Claims, 17 Drawing Sheets

U.S. PATENT DOCUMENTS

| | | |
|---|---|---|
| 6,758,565 B1 | 7/2004 | Cobb et al. |
| 6,793,351 B2 | 9/2004 | Nelson et al. |
| 6,805,445 B2 | 10/2004 | Silverstein et al. |
| 6,808,269 B2 * | 10/2004 | Cobb .......................... 353/31 |
| 6,831,722 B2 | 12/2004 | Ishikawa et al. |
| 7,167,314 B2 * | 1/2007 | Lerner et al. ................. 359/629 |
| 7,198,373 B2 * | 4/2007 | Silverstein et al. ............ 353/31 |

* cited by examiner

STEREOSCOPIC DISPLAY APPARATUS USING LCD PANEL

CROSS REFERENCE TO RELATED APPLICATIONS

The present application is related to U.S. patent application Ser. No. 11/120,331, filed May 3, 2005 Which is now U.S. Pat. No. 7,198,373, entitled DISPLAY APPARATUS USING LCD PANEL, by Silverstein et al., the disclosure of which is incorporated herein.

FIELD OF THE INVENTION

This invention generally relates to electronic projection and more particularly relates to a stereoscopic electronic projection apparatus using an LC modulator panel or panels for forming a full color stereoscopic projection image.

BACKGROUND OF THE INVENTION

Liquid crystal (LC) technology has been successfully harnessed to serve numerous display applications, ranging from monochrome alphanumeric display panels, to laptop computers, and even to large-scale full color displays. As is well known, an LC device forms an image as an array of pixels by selectively modulating the polarization state of incident light for each corresponding pixel. Continuing improvements of LC technology have yielded the benefits of lower cost, improved yields and reliability, and reduced power consumption and with steadily improved imaging characteristics, such as resolution, speed, and color.

One type of LC display component, commonly used for laptops and larger display devices, is the so-called "direct view" LCD panel, in which a layer of liquid crystal is sandwiched between two sheets of glass or other transparent material. Continuing improvement in thin-film transistor (TFT) technology has proved beneficial for direct view LCD panels, allowing increasingly denser packing of transistors into an area of a single glass pane. In addition, new LC materials that enable thinner layers and faster response time have been developed. This, in turn, has helped to provide direct view LCD panels having improved resolution and increased speed. Thus, larger, faster LCD panels having improved resolution and color are being designed and utilized successfully for full motion imaging.

Alternatively, miniaturization and the utilization of microlithographic technologies have enabled development of LC devices of a different type. Liquid crystal on silicon (LCOS) technology has enabled the development of highly dense spatial light modulators by sealing the liquid crystal material against the structured backplane of a silicon circuit. Essentially, LCOS fabrication combines LC design techniques with complementary metal-oxide semiconductor (CMOS) manufacturing processes.

Using LCOS technology, LC chips having imaging areas typically smaller than one square inch are capable of forming images having several million pixels. The relatively mature level of silicon etching technology has proved to be advantageous for the rapid development of LCOS devices exhibiting high speeds and excellent resolution. LCOS devices have been used as spatial light modulators in applications such as rear-projection television and business projection apparatus.

With the advent of digital cinema and related electronic imaging opportunities, considerable attention has been directed to development of electronic projection apparatus. In order to provide a competitive alternative to conventional cinematic-quality film projectors, digital projection apparatus must meet high standards of performance, providing high resolution, wide color gamut, high brightness, and frame-sequential contrast ratios exceeding 1,000:1. LCOS LCDs appear to have advantages as spatial light modulators for high-quality digital cinema projection systems. These advantages include relatively large device size, small gaps between pixels, and favorable device yields.

Referring to FIG. 1, there is shown a simplified block diagram of a conventional electronic projection apparatus 10 using LCOS LCD devices. Each color path (r=Red, g=Green, b=Blue) uses similar components for forming a modulated light beam. Individual components within each path are labeled with an appended r, g, or b, appropriately. Following the red color path, a red light source 20r provides unmodulated light, which is conditioned by uniformizing element 22r to provide a uniform illumination. A polarizing beamsplitter 24r directs light having the appropriate polarization state to a spatial light modulator 30r which selectively modulates the polarization state of the incident red light over an array of pixel sites. The action of spatial light modulator 30r forms the red component of a full color image. The modulated light from this image, transmitted along an optical axis $O_r$ through polarizing beamsplitter 24r, is directed to a dichroic combiner 26, typically an X-cube or a Philips prism. Dichroic combiner 26 combines the red, green, and blue modulated images from separate optical axes $O_r/O_g/O_b$ to form a combined, multi-color image for a projection lens 32 along a common optical axis O for projection onto a display surface 40, such as a projection screen. Optical paths for blue and green light modulation are similar. Green light from green light source 20g, conditioned by uniformizing element 22g is directed through a polarizing beamsplitter 24g to a spatial light modulator 30g. The modulated light from this image, transmitted along an optical axis $O_g$, is directed to dichroic combiner 26. Similarly blue light from red light source 20b, conditioned by uniformizing optics 22b is directed through a polarizing beamsplitter 24b to a spatial light modulator 30b. The modulated light from this image, transmitted along an optical axis $O_b$, is directed to dichroic combiner 26.

Among examples of electronic projection apparatus that utilize LCOS LCD spatial light modulators with an arrangement similar to that of FIG. 1 are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); U.S. Pat. No. 6,062,694 (Oikawa et al.); U.S. Pat. No. 6,113,239 (Sampsell et al.); and U.S. Pat. No. 6,231,192 (Konno et al.)

As each of the above-cited patents shows, developers of motion-picture quality projection apparatus have primarily directed their attention and energies to LCOS LCD technology, rather than to solutions using TFT-based, direct view LC panels. There are a number of clearly obvious reasons for this. For example, the requirement for making projection apparatus as compact as possible argues for the deployment of miniaturized components, including miniaturized spatial light modulators, such as the LCOS LCDs or other types of compact devices such as digital micromirrors. The highly compact pixel arrangement, with pixels typically sized in the 10-20 micron range, allows a single LCOS LCD to provide sufficient resolution for a large projection screen, requiring an image in the range of 2048×1024 or 4096×2048 pixels or better as required by Society of Motion Picture and Television Engineers (SMPTE) specifications for digital cinema projection. Other reasons for interest in LCOS LCDs over their direct-view LCD panel counterparts relates to performance attributes of currently available LCOS components, attributes such as response speed, color, and contrast.

Yet another factor that tends to bias projector development efforts toward miniaturized devices relates to the dimensional characteristics of the film that is to be replaced. That is, the image-forming area of the LCOS LCD spatial light modulator, or its digital micromirror device (DMD) counterpart, is comparable in size to the area of the image frame that is projected from the motion picture print film. This may somewhat simplify some of the projection optics design. However, this interest in LCOS LCD or DMD devices also results from an unquestioned assumption on the part of designers that image formation at smaller dimensions is most favorable. Thus, for conscious reasons, and in line with conventional reasoning and expectations, developers have assumed that the miniaturized LCOS LCD or DMD provides the most viable image-forming component for high-quality digital cinema projection.

One problem inherent with the use of miniaturized LCOS and DMD spatial light modulators relates to brightness and efficiency. As is well known to those skilled in the imaging arts, any optical system is constrained by the Lagrange invariant. A product of the area of the light-emitting device and the numerical aperture of the emitted light, the LaGrange invariant is an important consideration for matching the output of one optical system with the input of another and determines output brightness of an optical system. In simple terms, only so much light can be provided from an area of a certain size. As the Lagrange invariant shows, when the emissive area is small, a large angle of emitted light is needed in order to achieve a certain level of brightness. Added complexity and cost result from the requirement to handle illumination at larger angles. This problem is noted and addressed in commonly assigned U.S. Pat. No. 6,758,565 (Cobb et al.); U.S. Pat. No. 6,808,269 (Cobb); and U.S. Pat. No. 6,676,260 (Cobb et al.) These patents disclose electronic projection apparatus design using higher numerical apertures at the spatial light modulator for obtaining the necessary light while reducing angular requirements elsewhere in the system.

A related consideration is that image-forming components also have limitations on energy density. With miniaturized spatial light modulators, and with LCOS LCDs in particular, only so much energy density can be tolerated at the component level. That is, a level of brightness beyond a certain threshold level can damage the device itself. Typically, energy density above about 15 W/cm$^2$ would be excessive for an LCOS LCD. This, in turn, constrains the available brightness when using an LCOS LCD of 1.3 inch in diameter to no more than about 15,000 lumens. Heat build-up must also be prevented, since this would cause distortion of the image, color aberrations, and could shorten the lifespan of the light modulator and its support components. In particular, the behavior of the absorptive polarization components used can be significantly compromised by heat build-up. This requires substantial cooling mechanisms for the spatial light modulator itself and careful engineering considerations for supporting optical components. Again, this adds cost and complexity to optical system design.

Still other related problems with LCOS LCDs relate to the high angles of modulated light needed. The mechanism for image formation in LCD devices and the inherent birefringence of the LCD itself limit the contrast and color quality available from these devices when incident illumination is highly angular. In order to provide suitable levels of contrast, one or more compensator devices must be used in an LCOS system. This, however, further increases the complexity and cost of the projection system. An example of this is disclosed in commonly assigned U.S. Pat. No. 6,831,722 (Ishikawa et al.), which discloses the use of compensators for angular polarization effects of wire grid polarizers and LCD devices. For these reasons, it can be appreciated that LCOS LCD and DMD solutions face inherent limitations related to component size and light path geometry.

There have been various projection apparatus solutions proposed using the alternative direct view TFT LC panels. However, in a number of cases, these apparatus have been proposed for specialized applications, and are not intended for use in high-end digital cinema applications. For example, U.S. Pat. No. 5,889,614 (Cobben et al.) discloses the use of a TFT LC panel device as an image source for an overhead projection apparatus. U.S. Pat. No. 6,637,888 (Haven) discloses a rear screen TV display using a single subdivided TFT LC panel with red, green, and blue color sources, using separate projection optics for each color path. Commonly assigned U.S. Pat. No. 6,505,940 (Gotham et al.) discloses a low-cost digital projector with a large-panel LC device encased in a kiosk arrangement to reduce vertical space requirements. While each of these examples employs a larger LC panel for image modulation, none of these designs is intended for motion picture projection at high resolution, having good brightness levels, color comparable to that of conventional motion picture film, acceptable contrast, and a high level of overall image quality.

One attempt to provide a projection apparatus using TFT LC panels is disclosed in U.S. Pat. No. 5,758,940 (Ogino et al.) In the Ogino et al. '940 apparatus, one or more Fresnel lenses is used to provide collimated illumination to the LC panel; another Fresnel lens then acts as a condenser to provide light to projection optics. Because it provides an imaging beam over a wide area, the Ogino et al. '940 apparatus has a high light output, based on the Lagrange invariant described above. However, while it offers potential applications for TV projection apparatus and small-scale projectors, the proposed solution of the Ogino et al. '940 disclosure falls short of the performance levels necessary for high-resolution projection systems that modulate light and provide imaged light output having high intensity, at levels of 10,000 lumens and beyond.

Thus, it can be seen that, although digital cinema projection apparatus solutions have focused on the use of LCOS LCDs for image forming, there are inherent limitations in brightness and efficiency when using LCOS LCD components for this purpose. TFT LC panel solutions, meanwhile, would provide enhanced brightness levels over LCOS solutions. While projection apparatus using TFT LC panels have been disclosed, these have not been well suited to the demanding brightness requirements of high-performance digital cinema projection.

In cinema applications, the projector projects the modulated image onto a display screen or surface, which may be at a variable distance from the projector. This requires that the projector provide some type of focus adjustment as well as color alignment adjustment. With conventional LCOS apparatus such as that shown in FIG. 1, color alignment is performed by color combining optics, so that the three composite RGB colors are projected along the same axis. However, for solutions using TFT devices, there would be benefits to providing separate projection optics for red, green, and blue paths. Some of these benefits include simpler and less costly lenses with color correction for a narrow wavelength band at each lens. With such an approach, some alignment method must then be provided to form the color image from properly superimposed red, green, and blue images, thereby allowing the projector to be used over a range of distances from a display screen.

Other problems relate to the nature of light modulation by the TFT LC device and to the support components necessary for high brightness applications requiring high levels of image quality. Conventional solutions would constrain both the light output levels and overall image quality, obviating the advantages afforded by TFT use for projection applications. For example, the use of absorptive polarizers directly attached to the TFT panels, as these devices are commonly provided, is disadvantageous for image quality. Heat absorption from these films, typically exceeding 20% of the light energy, causes consequent heating of the LCD materials, resulting in a loss of contrast and contrast uniformity.

Stereoscopic or "3D" imaging techniques have been used to provide improved visual depth for projected images. In conventional stereoscopic projection, two overlapping images are projected onto a display surface, with each image having different optical properties. In stereoscopic imaging systems that use polarization to differentiate left and right images, there is one image at one polarization for the right eye, one image at an orthogonal polarization for the left. The viewer is provided with a pair of polarized goggles or glasses, with the left and right portions differing with respect to the orientation of the polarization axis. For example, the light projected for the left eye image may be s-polarized and the light for the right eye image p-polarized. Other stereoscopic systems may use color to differentiate left-eye from right-eye images, with corresponding color-selective filters in viewing glasses.

Conventional stereoscopic imaging systems using electronic display components are typically inefficient and provide low brightness levels. Thus, it can be appreciated that there would be advantages to a full-color stereoscopic projection apparatus that takes advantage of inherent Lagrange-invariant-related advantages of TFT LC devices and provides improved image quality.

SUMMARY OF THE INVENTION

Briefly, according to one aspect of the present invention to provide a stereoscopic imaging apparatus having:
a) an illumination source providing a first polarized illumination beam for a left eye imaging channel and a second polarized illumination beam for a right eye imaging channel, wherein the illumination source comprises at least one uniformizing element for uniformizing the first and second illumination beams;
b) a left channel modulation apparatus for modulating the first polarized illumination beam to provide the left eye portion of the stereoscopic image and a right channel modulation apparatus for modulating the second polarized illumination beam to provide the right eye portion of the stereoscopic image, wherein each channel modulation apparatus further comprises:
  i) a color separator for separating the polarized illumination beam into at least a first component wavelength illumination and a second component wavelength illumination;
  ii) at least two component wavelength modulating sections, each component wavelength modulating section accepting a corresponding component wavelength illumination and modulating the component wavelength illumination to provide a modulated component wavelength beam, each component wavelength modulating section comprising:
    a portion of a monochrome transmissive liquid crystal modulator panel that has been segmented into at least a first portion and a second portion, and wherein each portion is spatially separated from each other portion;
    an illumination path lens for focusing the corresponding component wavelength illumination through the corresponding portion of the monochrome transmissive liquid crystal modulator panel;
    an analyzer for further conditioning the polarization of the modulated component wavelength beam;
c) at least one projection lens for forming, onto a display surface, a composite image that superimposes an image formed from the modulated component wavelength beam of the left channel modulation apparatus with the image formed from the modulated component wavelength beam of the right channel modulation apparatus; and
d) a channel differentiator device provided to a viewer for separating the left eye portion and right eye portion of the stereoscopic image.

It is a feature of the present invention that, unlike current approaches that use miniaturized LCOS LCDs, the apparatus of the present invention employs one or more LCD panels for stereoscopic imaging in a projection apparatus intended for high-end electronic imaging applications.

It is an advantage of the present invention that it allows added brightness for the projected stereoscopic image. Various types of light sources could be used.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
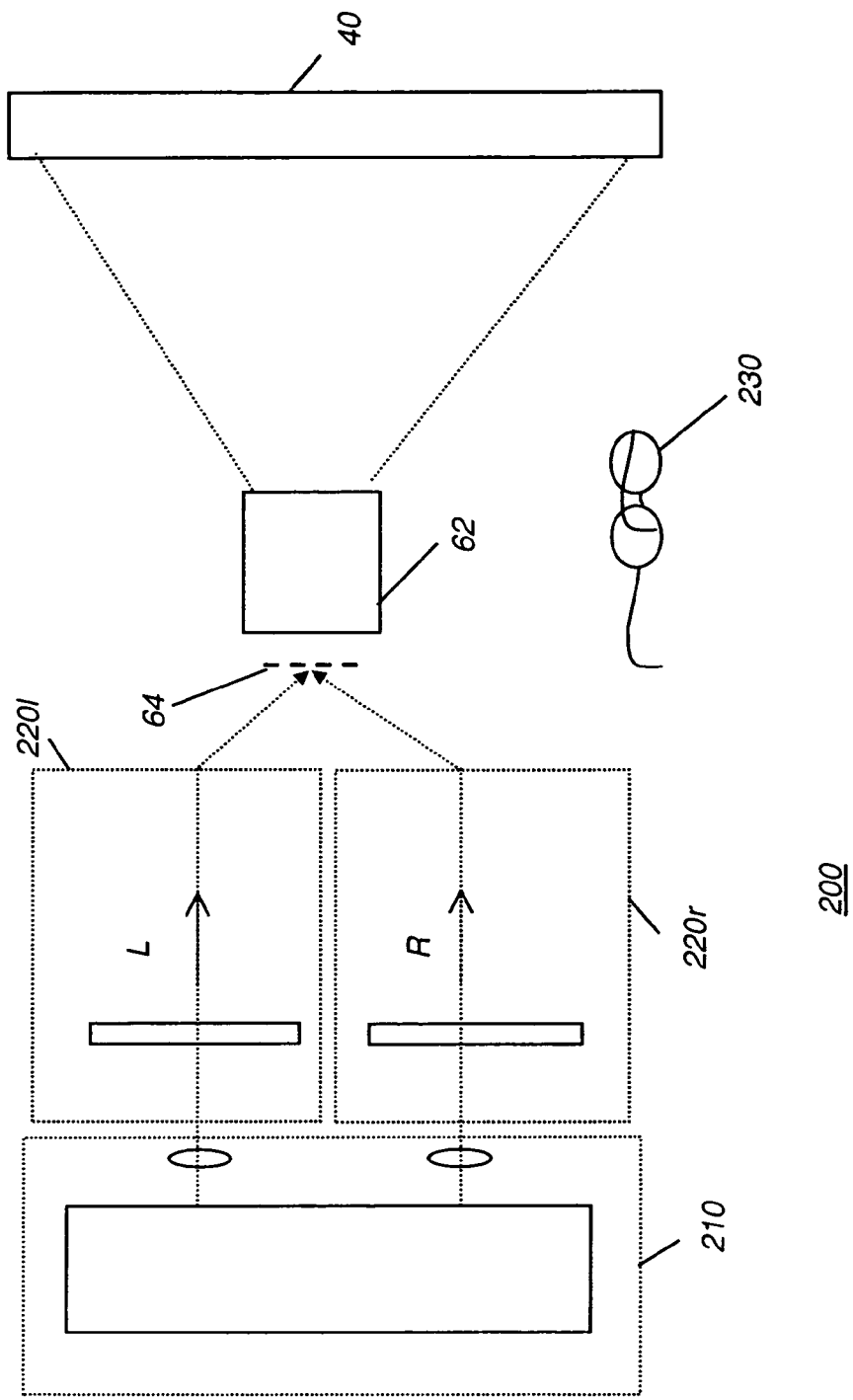
FIG. 2 is a block diagram of a stereoscopic imaging apparatus according to the present invention.

The present invention adapts one or more TFT LC devices for use in stereoscopic projection. The major components of a stereoscopic imaging apparatus 200 are shown in the block diagram of FIG. 2. An illumination source 210 splits light, according to a characteristic property such as polarization or spectral content, into two channels, a left channel and a right channel. Each channel is provided for modulation: the left channel to a modulation apparatus 220*l* and the right channel to a modulation apparatus 220*r*. Modulation apparatus 220*l* and 220*r* operate to form an image 64, such as an intermediate image as shown in FIG. 2, that is projected onto display surface 40 by a projection lens 62. The viewer is provided with a channel differentiator device 230, such as a pair of polarizing glasses or filter glasses, depending on how the left and right channels are modulated and provided on display surface 40.

FIG. 2 shows the basic model that applies in general for embodiments of the present invention. Specific embodiments then use different variations from this model, employing different methods for differentiating left and right viewing channels, for conditioning the light provided to each channel, for light modulation within each channel, for projection of the image onto display surface 40, and for viewer outfitting to differentiate left from right channels and to obtain a stereoscopic effect thereby. Still other alternate embodiments employ the basic arrangement of FIG. 2 to form a high resolution image that may not be stereoscopic.

Figure 3:
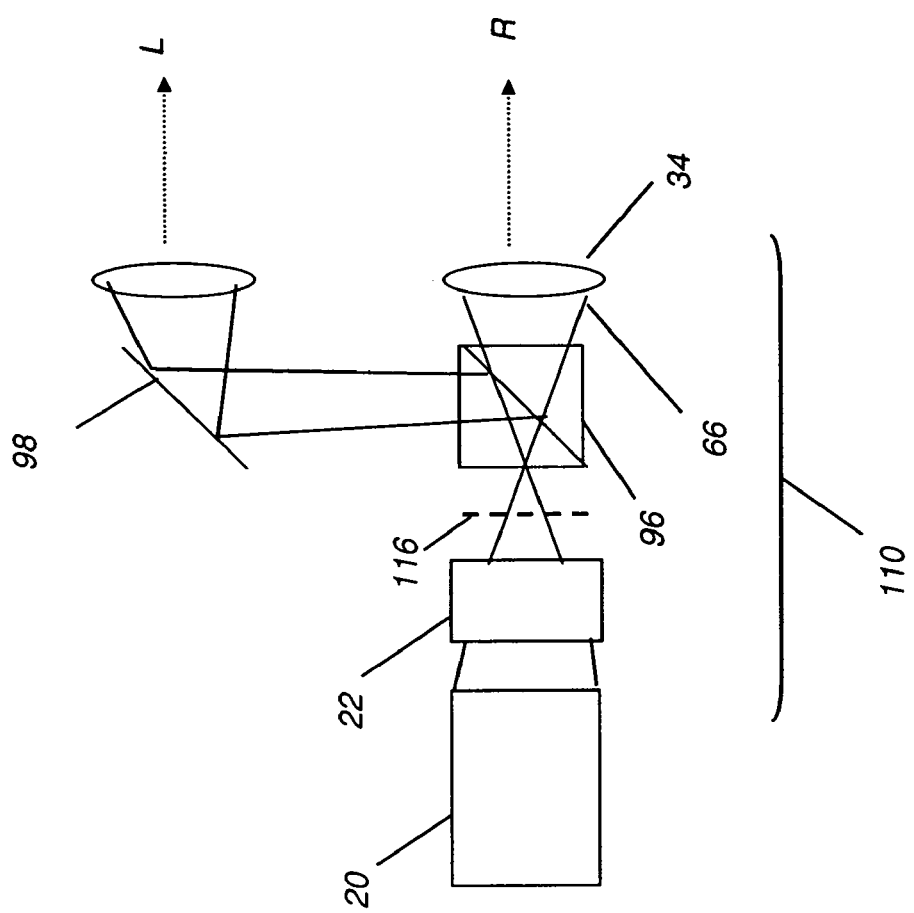
FIG. 3 is a block diagram showing a polarized light providing apparatus.

One option for differentiating left and right channels is to employ light having different polarization states. Referring to FIG. 3, there is shown a polarized light providing apparatus 110 that could be used as illumination source 210 in one embodiment, providing left and right channels of stereoscopic imaging apparatus 200. Light from a light source 20 is uniformized by a uniformizing element 22 that spatially distributes or homogenizes the light to provide a more uniform illumination field. The uniformized light is directed to a shutter 116 and a polarizer 96 that transmits light having one polarization, such as p-polarization in one embodiment, to one modulation channel, labeled R for the right channel in FIGS. 2 and 3, as a substantially polarized illumination beam 66. Polarizer 96 reflects light having the orthogonal polarization (s-polarization in this example) for the other modulation channel. A mirror 98, or reflective polarization sensitive coating, then directs the light having orthogonal polarization to the other modulation channel, labeled L in FIGS. 2 and 3. Lens 34 directs the polarized light into the appropriate modulation channel.

Light source 20 in FIG. 3 can be any of a number of types of lamp or other emissive component. It can be appreciated that it would be particularly advantageous to select a commercially available component as light source 20, to take advantage of low cost and availability due to high manufacturing volumes. In one embodiment, a conventional CER-MAX® xenon arc lamp, available from PerkinElmer Inc., Wellesley, Mass., is used. The capability to efficiently use the light of such off-the-shelf devices is a particular advantage when using a larger size TFT LC device, as opposed to using smaller LCOS components that are unable to use a significant portion of the light available due to LaGrange limitations, as noted earlier in the background section. Other alternative light sources include high-power LEDs, which can be distributed in an array when using uniformizing optics. Another option is to use ultra-high pressure Mercury lamps, for example. Conventional xenon bubble lamps offer yet another option and provide better color gamut than Mercury lamps. In all of these cases, substantially unpolarized light is typically provided from the source.

In one embodiment, polarizer 96 is a wire grid polarizer, such as the polarizer type disclosed in U.S. Pat. No. 6,452,724 (Hansen et al.) Wire grid polarizers of various types are commercially available from Moxtek, Inc., Orem, Utah. The wire grid type of polarizer is particularly advantaged for handling high levels of light intensity, unlike conventional types of absorptive polarizer. In one embodiment the wire grid polarizer is placed such that wire elements on its wire surface side face toward the LCD panel. This configuration reduces thermally induced birefringence as disclosed in commonly assigned U.S. Pat. No. 6,585,378 (Kurtz et al.) Polarizer 96 could alternately be a conventional prism polarizer, such as a MacNeille polarizer, familiar to those skilled in the electronic imaging arts.

Figure 4:
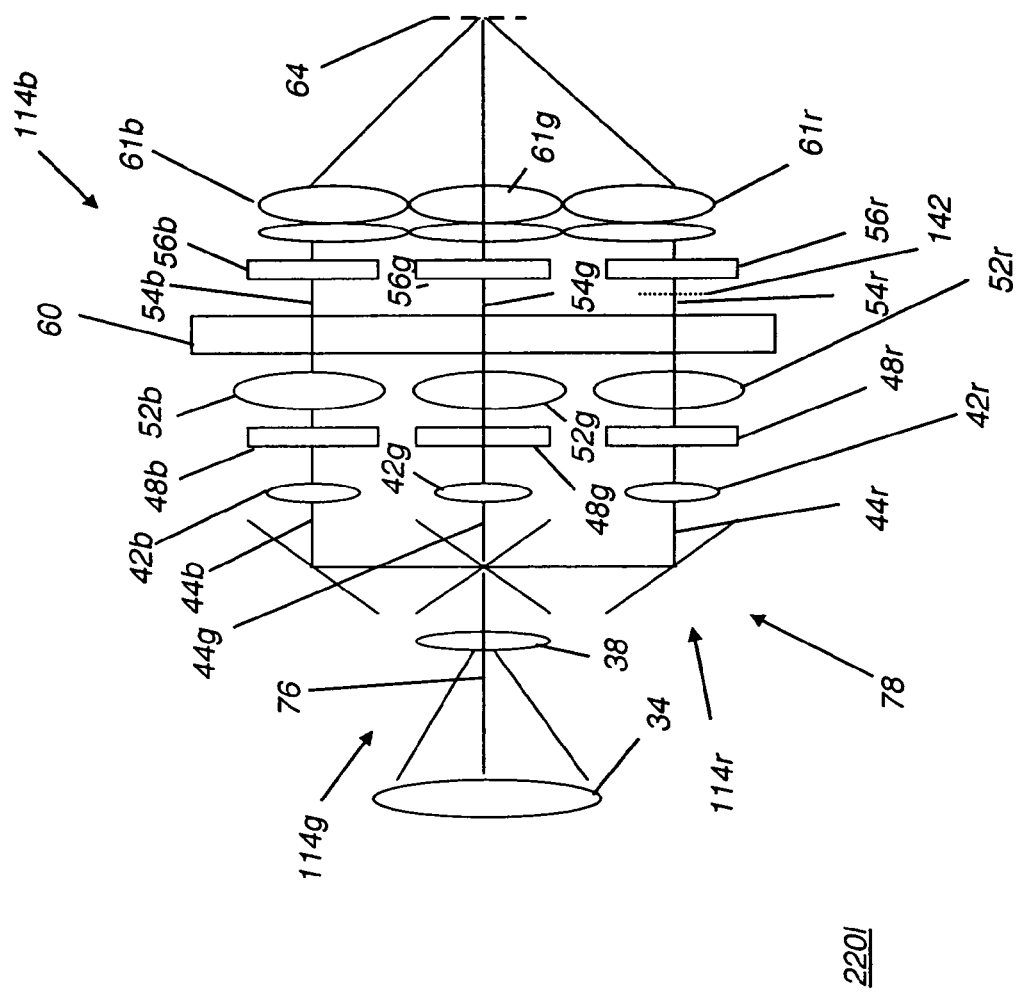
FIG. 4 is a block diagram showing a left- or right-channel modulation apparatus.

Referring to FIG. 4, there is shown channel modulation apparatus 220*l* for the left eye; channel modulation apparatus 220*r* for the right eye would be similarly constructed. Here, an LC modulator panel 60 is segmented into three portions, one for each component color: Red (R), Green (G), and Blue (B), as is described subsequently. A condensing lens 38 then directs a uniformized polarized beam 76 to a color separator 78 that separates the multiple wavelengths into component color wavelengths, conventionally red, green, and blue (RGB) along separate illumination paths 44*r* (red), 44*g* (green) and 44*b* (blue).

There are at least three component wavelength modulating sections 114*r*, 114*g*, 114*b*, as shown in FIG. 4, each aligned along a corresponding illumination path 44*r*, 44*g*, 44*b*. In each component wavelength modulating section 114*r*, 114*g*, 114*b*, a condensing lens 42*r*, 42*g*, 42*b* directs the corresponding component wavelength illumination through an optional polarizer 48*r*, 48*g*, 48*b*. Lenses 52*r*, 52*g*, and 52*b*, such as Fresnel lenses, then focus this illumination through a monochrome transmissive liquid crystal modulator panel 60 that is segmented to handle each component color for modulation, as is described subsequently. Liquid crystal modulator panel 60 forms red, green, and blue component wavelength beams 54*r*, 54*g*, and 54*b*. Component wavelength beams 54*r*, 54*g*, and 54*b* are the modulated light beams that are combined to form the color image. Analyzers 56*r*, 56*g*, and 56*b* condition the polarization of red, green, and blue component wavelength beams 54*r*, 54*g*, and 54*b*. In this embodiment, lenses 61*r*, 61*g*, and 61*b* form image 64 as an intermediate image for projection. Here, the modulated component wavelength beams 54r, 54g, and 54b are superimposed to form color image 64 for projection. It must be noted that image 64 may be an intermediate image, as described above, or may be the image in the projection plane.

Configuration of Modulator Panel 60

Figure 5:
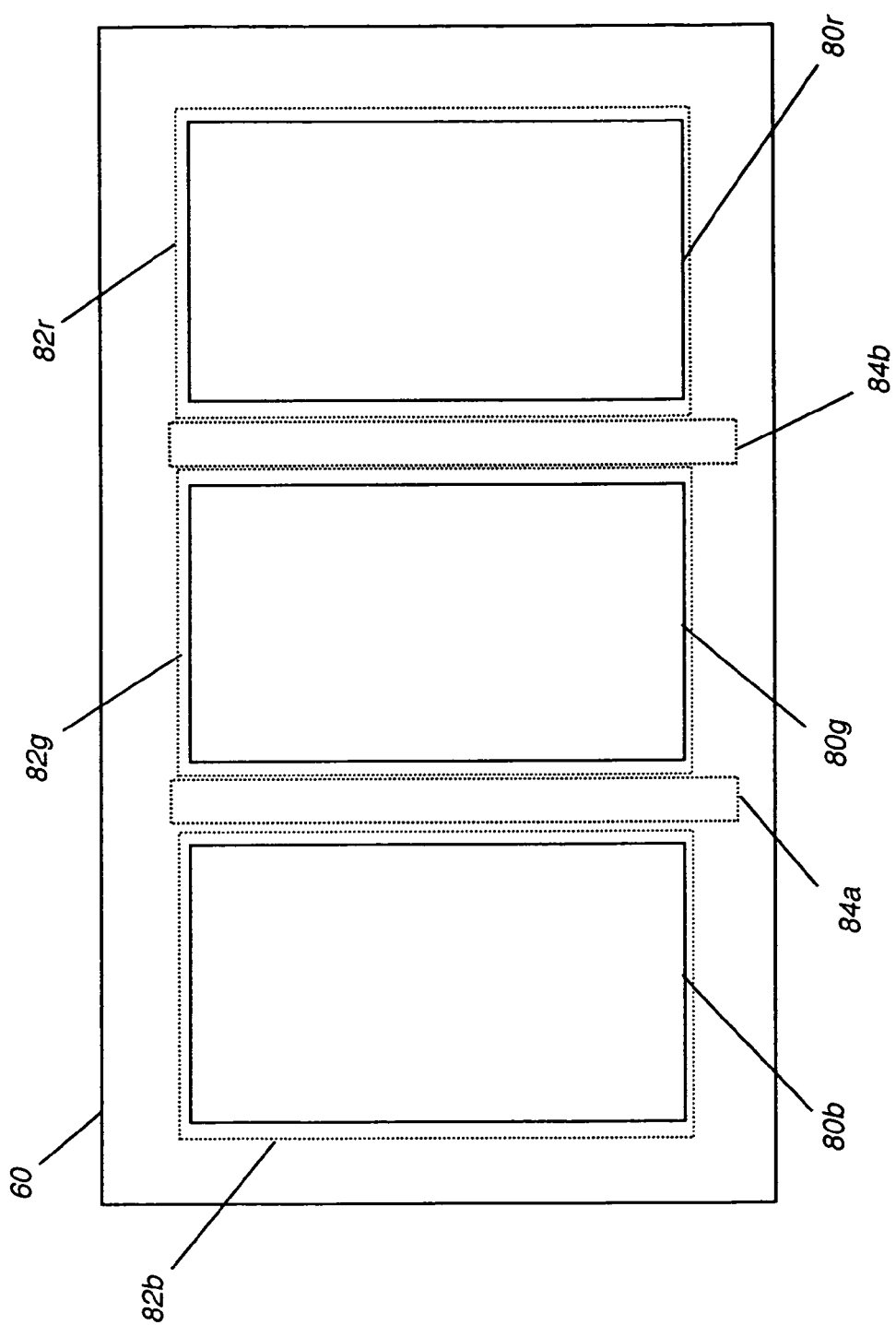
FIG. 5 is a plan view of a TFT LC device segmented according to the present invention, subdivided into component color modulating sections.

One aspect of the present invention relates to the segmentation of monochrome liquid crystal modulator panel 60, as shown in the plan view of FIG. 5. The red, green, and blue component colors in respective red, green, and blue illumination paths 44r, 44g, and 44b (FIG. 4) are modulated by a red component modulating section 80r; a green component modulating section 80g, and a blue component modulating section 80b, respectively. In one embodiment, where LC modulator panel 60 has 2048×3240 pixel resolution, each component color modulating section 80r, 80g, and 80b has 2048×1080 pixel resolution. Higher resolution panel alternatives would be advantaged for applications such as digital cinema.

Each modulating section 80r, 80g, 80b has a corresponding border portion 82r, 82g, 82b. Border portions 82r, 82g, 82b include some number of pixels that are unused but available to be used as part of modulating section 80r, 80g, 80b. Border portions 82r, 82g, 82b are used to facilitate alignment of the component color modulated light, as is described subsequently.

Each modulating section 80r, 80g, 80b is separated from its adjacent modulating section(s) 80r, 80g, 80b by a light blocking segment 84a, 84b. Light blocking segments 84a, 84b consist of pixels in a dark or black state, acting as masks for reflecting overlapping light from adjacent red, green, and blue illumination paths 44r, 44g, and 44b. Physical blocking elements may be used in addition to or in lieu of these dark state pixels.

Figure 6A:
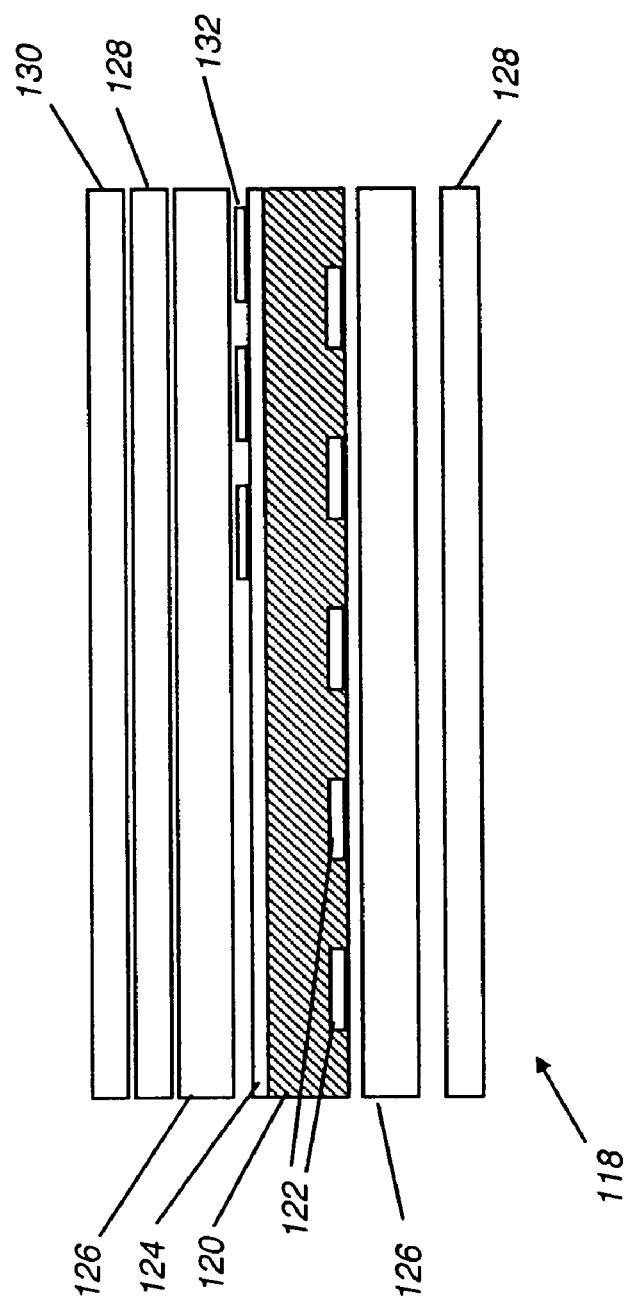
FIG. 6A is a cross section of a conventional large panel LC device.

For the embodiment of FIG. 4, LC modulator panel 60 is modified and simplified for use in a projection application. Referring first to FIG. 6A, there is shown a conventional LC modulator panel 118 as provided by the manufacturer for display use. In this conventional arrangement, an LC material 120, with its control electrodes on an ITO layer 124 and thin-film transistors 122 is sandwiched between plates of glass 126, along with a color filter array 132. Front and rear polarizers 128 are absorptive sheets whose performance is compromised by high heat levels, causing variable thermal nonuniformities in the projected image. A compensation film 130 is also provided for enhancing contrast. In many devices, other enhancement films are used but not shown, such as diffusing layers.

Figure 6B:
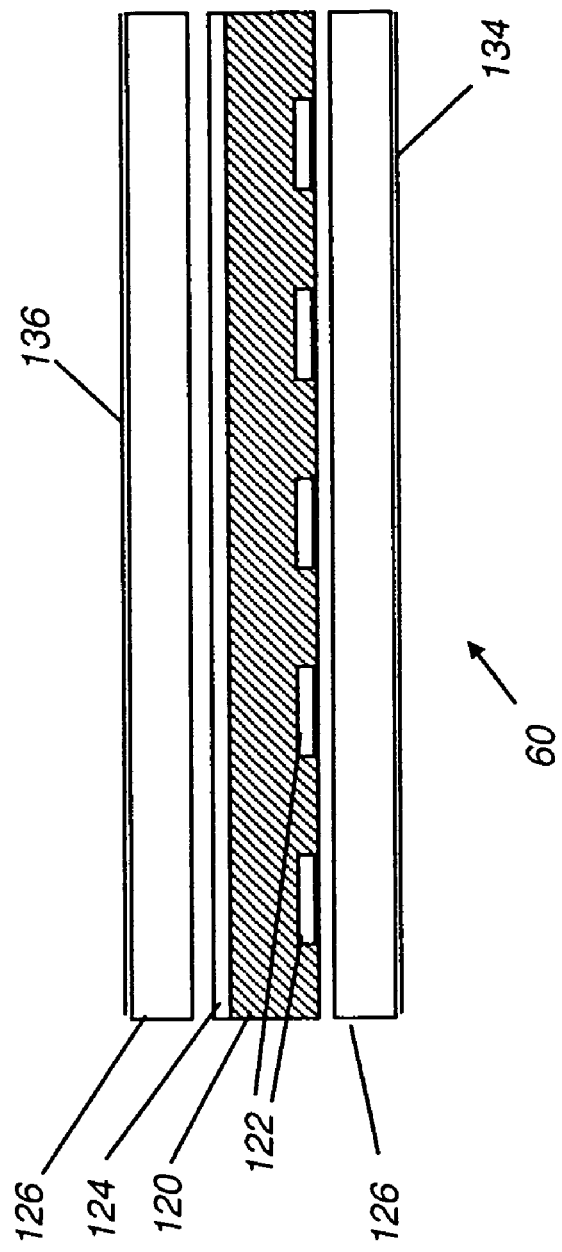
FIG. 6B is a cross section of a simplified large panel LC device according to the present invention.

FIG. 6B shows the simplified arrangement of LC modulator panel 60 as used in the present invention. Compensation film 130 may be removed; even if maintained, the performance requirements and cost of compensation film 130 are significantly reduced. Front and rear polarizers 128 are also removed from LC modulator panel 60 itself; separate wire grid polarizers are used for polarizers 48r, 48g, 48b and analyzers 56r, 56g, 56b. Polarizers 48r, 48g, 48b and analyzers 56r, 56g, 56b are spaced apart from the surface of glass sheets 126. Wire grid polarizers, capable of handling high light levels without absorbing substantial amounts of light energy, are particularly well suited to high intensity application in stereoscopic display apparatus 200. Spacing them apart from LC material 120 prevents heat transfer that would negatively impact the uniformity of the image. Color filter array 132 is no longer needed. An optional antireflection coating 134, 136 may be provided on both external surfaces of glass 126. Antireflection coating 134, 136 would help to reduce stray light and increase the ANSI contrast ratio, minimizing undesirable interactions of light from neighboring pixels.

Illumination Source and Optics

A notable improvement over conventional TFT LC projection apparatus is the use of uniformizing element 22 (FIG. 3) for providing a uniform illumination from a light source 20. Uniformizing element 22 conditions the output from light source 20 to provide a uniformly bright illumination beam for modulation. In one embodiment, an integrating bar provides uniformizing element 22. Alternate embodiments include the use of a lenslet array or some combination of lenslet and other integrating components.

An optional shutter 116, whose position may be at the location of the dotted line in FIG. 3, may be implemented within polarized light providing apparatus 110 in order to momentarily darken the display to allow time for a suitable transition between images. Shutter 116 may be needed depending on LC modulator panel 60 response speed. Although response speeds of LC modulator panels 60 have improved sufficiently for conventional video display, it remains to be seen if there will be sufficient improvement to allow imaging with ghost-free motion, particularly with image content that contains considerable action and transitions. Shutter 116 would be used to block the light to LC modulator panel 60 during transition times, effectively reducing the overlay of images between frames. A suitable shutter mechanism is disclosed, for example, in commonly assigned U.S. Pat. No. 6,513,932 (Ehrne et al.)

Figure 7:
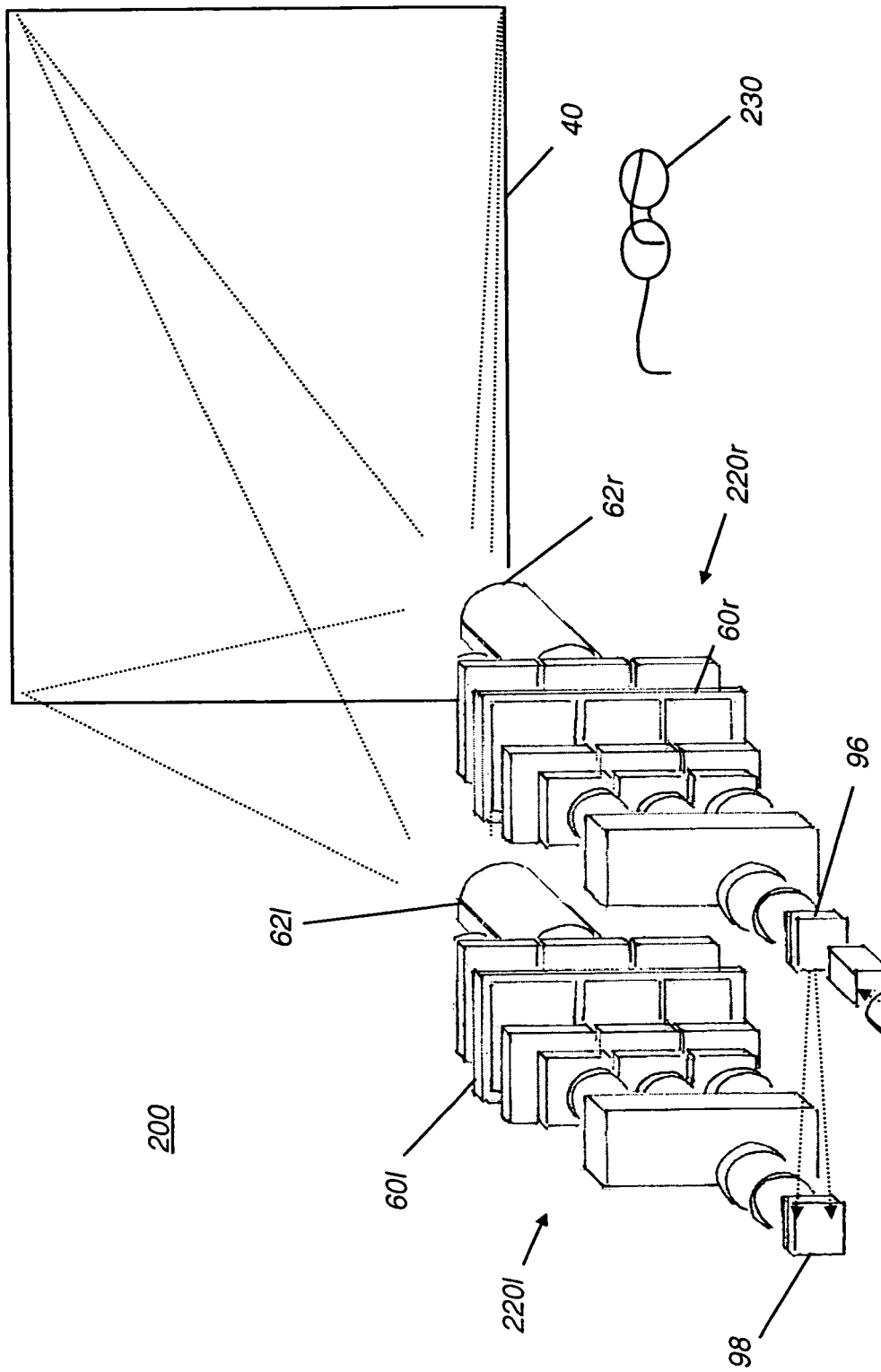
FIG. 7 is a perspective view of a projection apparatus according to the present invention.

FIG. 7 shows a perspective view of stereoscopic imaging apparatus 200 in one embodiment, using the overall arrangement shown in the schematic block diagram of FIG. 4. Here, individual modulator panels 60l and 60r are used in left and right channel modulation apparatus 220l and 220r. Each modulation apparatus 220l and 220r has a corresponding projection lens 62l and 62r. It must be observed that other arrangements are possible. For example, instead of the two modulator panels 60l and 60r shown, a single modulator panel 60 could be segmented appropriately to provide left and right viewing channels, such as using a separate color wheel or color scrolling arrangement for each channel. Optical components for each channel could cooperate to form a single intermediate image, thus allowing use of a single projection lens 62 as was shown in the basic model of FIG. 2. Alternately, there could be a separate projection lens for each color channel from each channel modulation apparatus 220l, 220r.

Color Separation

As was shown in FIG. 4, uniformized polarized beam 76 goes to color separator 78. In an alternative embodiment, there could be a separate uniformizer 22 in each channel modulation apparatus 220l, 220r; however, this could cause some non-uniformity between left- and right-image channels.

Figure 8:
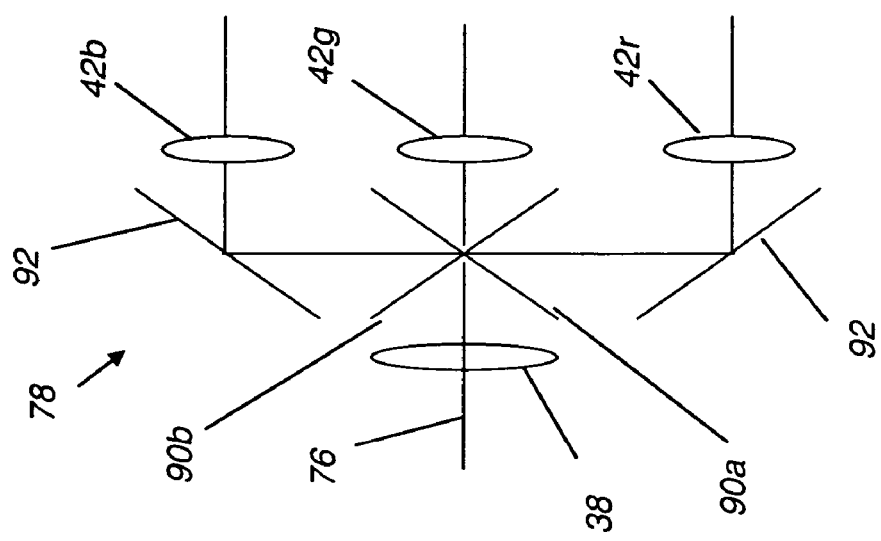
FIG. 8 is a block diagram showing a color separator in one embodiment.

FIG. 8 shows the components of color separator 78 for one embodiment in more detail. An arrangement of crossed dichroic surfaces 90a, 90b is used to split the multiple wavelength light of uniformized polarized beam 76 into the key red, green, and blue component wavelengths for modulation as red, green, and blue component wavelength beams 54r, 54g, and 54b, respectively. Turning mirrors 92 redirect red and blue component wavelength beams 54r and 54b in the embodiment of FIG. 8. Alternate embodiments include use of dichroic separating components in a fashion such that more than three color bands are separated, enabling a larger color gamut.

The improved light efficiency afforded by the use of a large modulator panel 60 can be utilized to provide a projection gamut that is substantially larger than that provided using conventional video, such as SMPTE "C" color space or even proposed Digital Cinema SMPTE gamut defined by (Red: 0.680 x, 0.320 y, 10.1 Y, Green: 0.265 x, 0.690 y, 34.6 Y, Blue: 0.150 x, 0.060 y, 3.31 Y). There is interest in making the gamut at least as large or larger than that of motion picture film. Dichroic filters can be selected and positioned to block portions of the spectral bands between the typical component color bands blue, green, and red, thereby increasing the color space that stereoscopic imaging apparatus 200 can provide.

Fresnel Lenses

Use of Fresnel lenses as lenses 52r, 52g, and 52b in illumination paths 44r, 44g, and 44b, as shown in FIG. 4, is particularly advantageous for directing light toward the entrance pupils of corresponding lenses 61r, 61g, and 61b. By placing Fresnel lenses 52r, 52g, and 52b in illumination paths 44r, 44g, and 44b, imaging aberrations are minimized. Fresnel lenses are typically molded and may exhibit nonuniformities that are particularly visible if the lens is used with image-modulated light. Of course, other suitable types of lenses could be used for lenses 52r, 52g, and 52b, preferably lenses with a thin dimensional profile.

Figure 10:
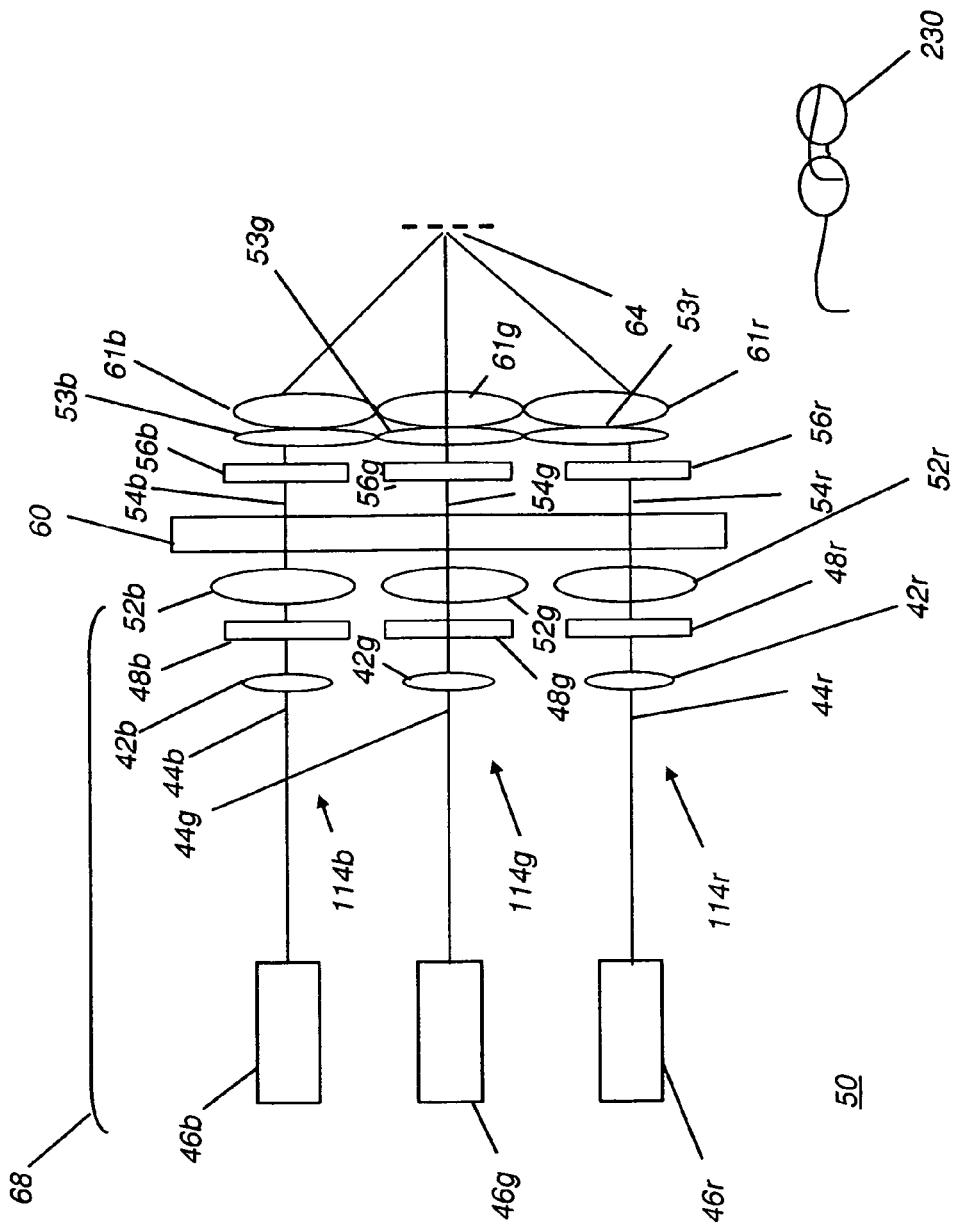
FIG. 10 is a block diagram of an embodiment using multiple light sources and two Fresnel lenses in each color channel.

FIG. 10 shows an alternate embodiment using a pair of lenses such as Fresnel lenses in each component wavelength modulating section 114r, 114g, and 114b, one placed as an illumination path lens in each illumination path 44r, 44g, 44b, the other placed as a modulated beam lens in each modulated component wavelength beam 54r, 54g, 54b. In the blue color channel, lens 52b is in illumination path 44b; a second lens 53b is in component wavelength beam 54b. In the green color channel, lens 52g is in illumination path 44g; a second lens 53g is in the modulated component wavelength beam 54g. In the red color channel, lens 52r is in illumination path 44r; a second lens 53r is in modulated component wavelength beam 54r. With the arrangement of FIG. 10, first lens 52r, 52g, and 52b in the illumination beam for each component wavelength modulating section 114r, 114g, 114b reduces the angle of light directed into modulator panel 60, providing a measure of collimation, thereby improving the contrast performance. The second lens 53r, 53g, and 53b would be placed in modulated component wavelength beam 54r, 54g, 54b from LC modulator panel 60, to direct the light toward the entrance pupils of corresponding lenses 61r, 61g, and 61b. In one embodiment, each of lenses 52r, 52g, 52b and 53r, 53g, 53b are Fresnel lenses.

In an alternate embodiment, a pair of crossed cylindrical Fresnel lenses can be used in one or more of component wavelength modulating sections 114r, 114g, 114b as an alternative to the conventional circularly symmetric Fresnel lens types. Crossed cylindrical Fresnel lenses are rotated with respect to each other and can be further rotated at an angle to LC modulator panel 60 to minimize or eliminate moire and aliasing.

In one embodiment, stereoscopic display apparatus 200 uses anti-ghost Fresnels, such as those produced by manufacturers such as Reflexite Corporation, Rochester, N.Y. As another alternative, holographic optical components could be used in the place of Fresnel lenses as one or more of lenses 52r, 52g, and 52b. Glass molded Fresnel lenses would help to minimize problems with stress birefringence from light absorption, such as decreased contrast uniformity across the image.

Control Loop for Projection Lens 62 Alignment

Figure 9:
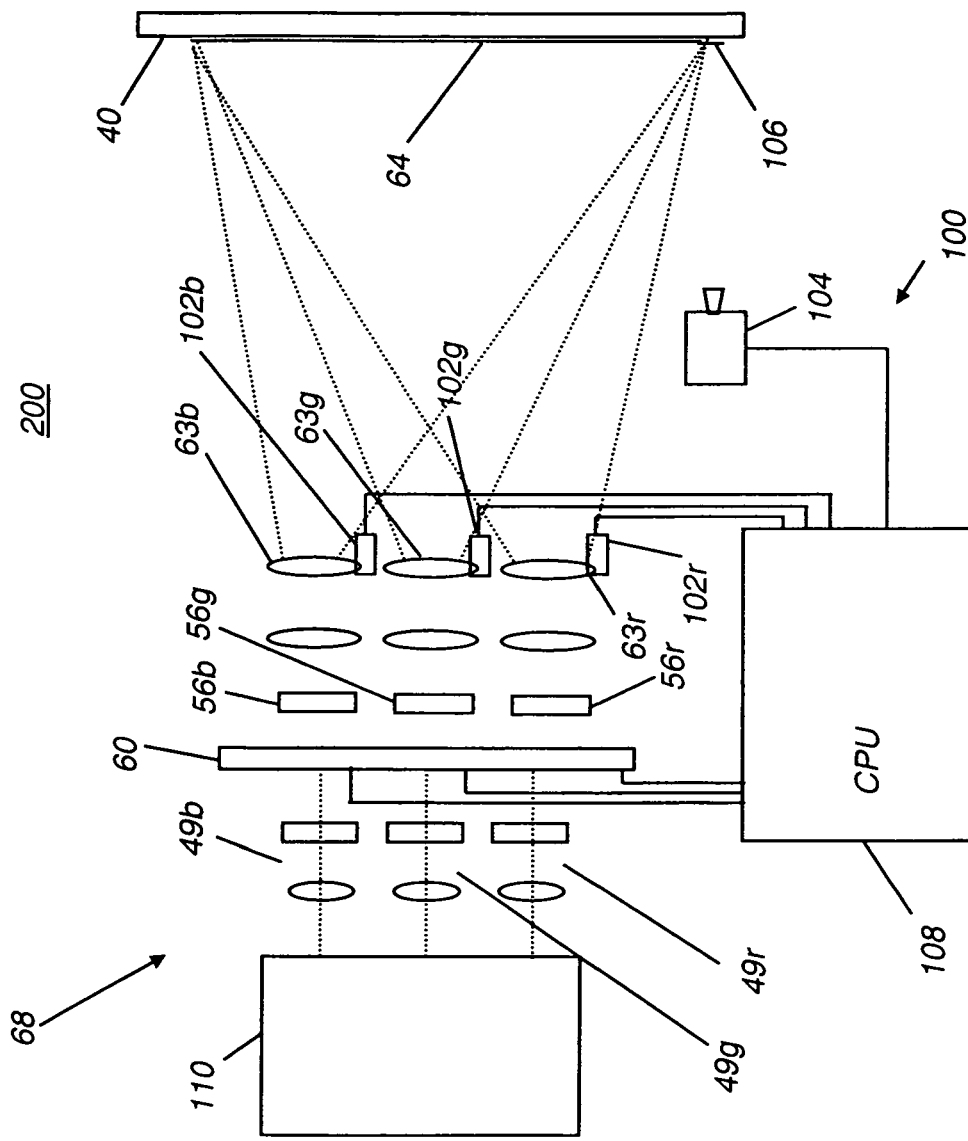
FIG. 9 is a block diagram showing a projection apparatus with a control loop for alignment.

FIG. 9 shows a control loop 100 arranged for automated alignment, in an embodiment using multiple projection lenses 63r, 63g, and 63b in each color channel. A sensor 104, such as an electronic camera, senses light from a target 106 that may be part of image 64 on display surface 40 or may be separated from image 64. Target 106 is devised to show proper overlap of the modulated component color images projected onto display surface 40. Methods such as those disclosed in commonly-assigned U.S. Pat. No. 6,793,351 (Nelson et al.) may be used to detect proper overlap at a control logic processor 108 and to counter any offset between colors detected by sensor 104. Adjustment of projection lenses 63r, 63g, and 63b may be effected using a combination of methods. Alignment in units of complete pixels can be accomplished electronically, by shifting the position of the corresponding red, green, or blue component modulating sections 80r, 80g, and 80b, using a method similar to that disclosed in U.S. Pat. No. 5,729,245 (Gove et al.) Corresponding actuators 102r, 102g, and 102b, such as stepping motors or piezoelectric actuators can be used to effect fine tuning alignment adjustment, either of full pixels or of fractional increments of a pixel, by moving projection lenses 63r, 63g, and 63b themselves. In one embodiment, a combination of the two methods is used, first attempting alignment by shifting the relative positions of one or more of red, green, or blue component modulating sections 80r, 80g, and 80b, utilizing pixels in border portions 82r, 82g, and 82b as needed. Following this shifting of red, green, or blue component modulating sections 80r, 80g, and 80b, fine tuning adjustment is then performed by driving actuators 102r, 102g, and 102b as needed.

Alternate Embodiments

The embodiments shown in FIGS. 4, 8, and 9 show stereoscopic display apparatus 200 using the conventional set of red, green, and blue component colors. Other arrangements are possible, including the use of additional colors, to provide an enhanced color gamut. Or, different component colors could be used to form color image 64. In an alternate embodiment using four colors, two LC modulator panels 60 could be used in each channel modulation apparatus 220l, 220r, each LC modulator panel 60 configured to have two component-color modulating sections.

In an alternate embodiment, a single LC modulator panel 60 is used in combination with a scrolling color filter device that separates the light into color bands, separated by light blocking regions. The color bands can be scanned across LC modulator panel 60 using prism optics or using a color wheel or other type of color scrolling mechanism. A blocking region is utilized to prevent color blurring during transition times between the colors. The modulator is subsequently modulated in synchronization with the particular color light provided to apply the appropriate portion of the composite color image. Scrolling color background and techniques are described, for example, in an article entitled "Sequential Color Recapture and Dynamic Filtering: A Method of Scrolling Color" by D. Scott Dewald, Steven M. Penn, and Michael Davis in *SID 00 Digest*, pages 1-4.

Figure 11:
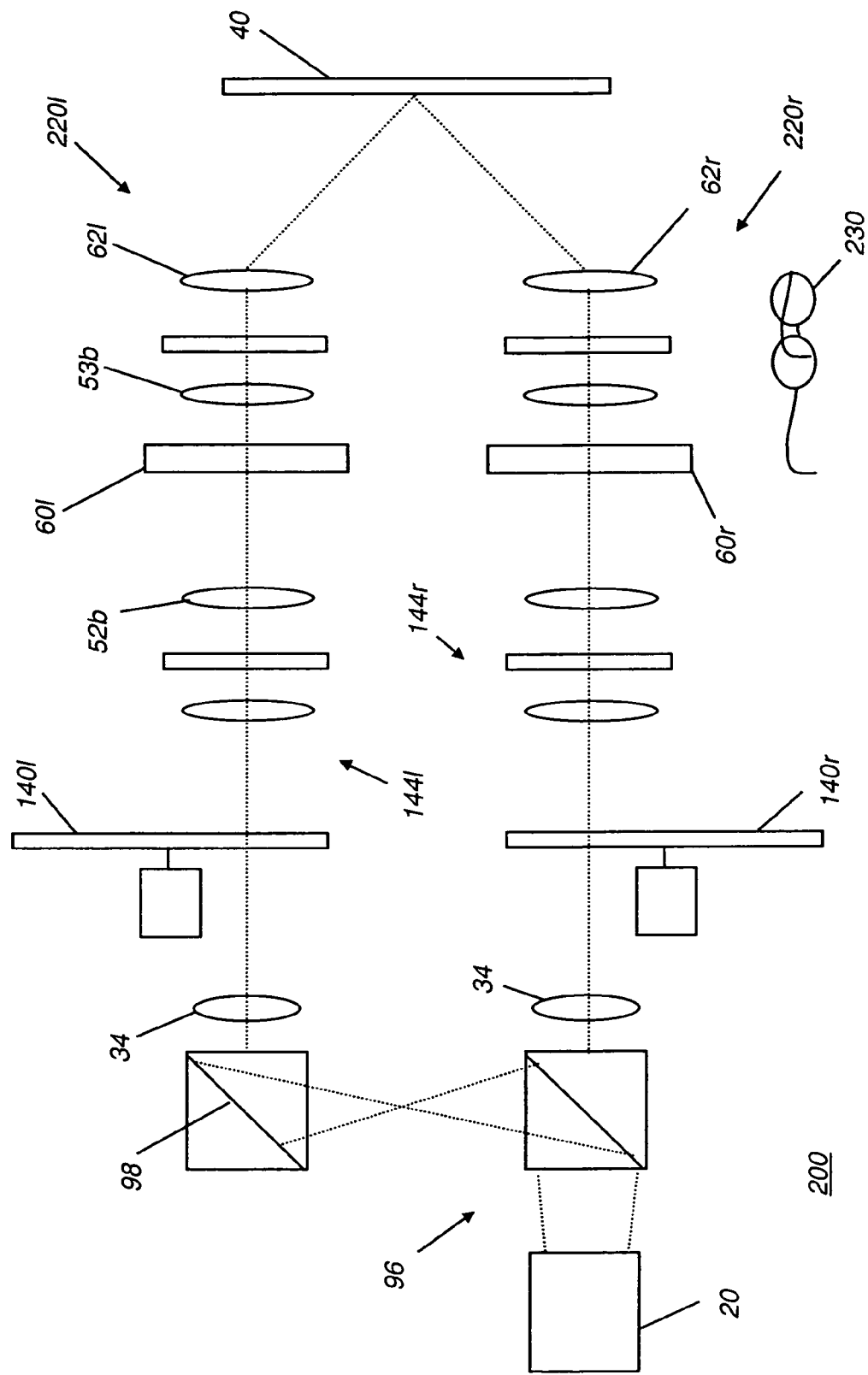
FIG. 11 is a schematic block diagram showing an alternate embodiment using color scrolling in a two panel apparatus.

A color scrolling embodiment of stereoscopic imaging apparatus 200, as shown in FIG. 11, utilizes two modulator panels 60l and 60r, each with a color scrolling element 140l and 140r, respectively. Color scrolling elements 140l, 140r, such as a color scrolling wheel or some combination of components including a color separator with a scanning prism, for example, sequentially scans color light of various wavelengths using techniques for providing a spectral profile familiar to those skilled in the digital projector arts. LC modulator panel 60l, 60r sequentially modulates each incident color of light provided from color scrolling element 140l, 140r to provide modulated light for projection.

Each modulator panel 60l, 60r has supporting optical components in its corresponding illumination path 144l, 144r, similar to that described with reference to FIG. 4, and provides modulated light as a component wavelength beam 54c, 54d to a projection lens 62l, 62r. Illumination optics using color scrolling components could employ color separation, color scrolling and light-directing techniques similar to those disclosed in U.S. Pat. No. 6,280,034 (Brennesholtz), for example.

Where color scrolling element 140l, or 140r is a color scrolling wheel, a sequence utilizing repeated complementary pairs of colors may be particularly advantageous. In such an arrangement, color scrolling element 140l, providing a spectral profile for the left-eye image, could be a filter wheel having a red, green, and blue filter for forming its set of colors. Color scrolling element 140r, providing a different spectral profile for the right-eye image, would then be a filter wheel having complementary cyan, magenta, and yellow filter for forming its set of colors. The sequencing of these filter wheels would be timed so that the combined image formed from the two modulator panels 60l, 60r would be additive with respect to color, with the combined image appearing to be white during each part of the scrolling sequence. This would be the case, for example, when simultaneously projecting each primary color (red, green, blue) paired with its corresponding complement color (cyan, magenta, yellow). Combining this approach with the advantages of enhanced brightness and improved imaging performance provided by the present invention allows an expanded color gamut over earlier designs.

In an alternate embodiment, instead of providing two separate modulator panels 60l, 60r, a single modulator panel 60 could be subdivided into two segments. One segment would serve for the right channel, the other for the left.

Images from either two color wheels or from channels using three color component wavelength modulating sections 114r, 114g, and 114b can be combined at an intermediate image plane. With this arrangement, intermediate image 64 may actually be smaller than modulator panel 60, so that intermediate image 64 can be magnified to the large screen size by a single projection lens 62. Optical convergence can be done at the time of fabrication, so that only a single projection lens adjustment is necessary for an operator. This approach has been shown to be of value as demonstrated in commonly assigned U.S. Pat. No. 6,808,269 (Cobb) and U.S. Pat. No. 6,676,260 (Cobb et al.)

Referring again to FIG. 10, there is shown a block diagram of stereoscopic imaging apparatus 200 in an alternate embodiment using individual red, green, and blue light sources 46r, 46g, and 46b in an illumination section 68. Light sources 46r, 46g, and 46b may include lasers, LEDs, or other light source types and may also be supported by light conditioning components such as uniformizers, as were described with reference to FIG. 3. Light sources 46r, 46g, and 46g may be polarized or provided with polarizers.

One advantage of the present invention is that compensators may not be needed or at least that the need for compensators may be minimized. As is well known in the art, there are two basic types of compensator films. An uniaxial film with its optic axis parallel to the plane of the film is called an A-plate. An uniaxial film with its optic axis perpendicular to the plane of the film is called a C-plate. Alternately, the A-plate can be described as providing XY birefringence (an anisotropic medium with XY retardance) in the plane of the compensator, while the C-plate provides Z birefringence along the optical axis in the direction of beam propagation through the compensator. A uniaxial material with $n_e$ greater than $n_o$ is called positively birefringent. Likewise, a uniaxial material with $n_e$ smaller than $n_o$ is called negatively birefringent. Both A-plates and C-plates can be positive or negative depending on their $n_e$ and $n_o$ values. As is well known in art, C-plates can be fabricated by the use of uniaxially compressed polymers or casting cellulose acetate, while A-plates can be made by stretched polymer films such as polyvinyl alcohol or polycarbonate.

The present invention minimizes or eliminates the need for C-plate compensators, since using the larger LC panels as modulator panel 60 results in reduced angular sensitivity. Referring to FIG. 4, a dotted line 142 indicates a possible position for an optional A-plate compensator in red component wavelength beam 54r. Other component wavelength modulating sections 114r, 114g, and 114b may also benefit from an A-plate compensator in a similar position. Alternately, a compensator could be disposed in the illumination path, such as prior to Fresnel lens 52r, 52g, 52b, for example. In other embodiments, A-plate compensation may be supplemented with some additional level of C-plate compensation. In still other embodiments, a C-plate compensator would be sufficient. Any of a number of types of compensator can be used, including film based compensators, compensators formed from a multilayer thin film dielectric stack, and compensators using formed birefringent structures, for example.

Figure 12:
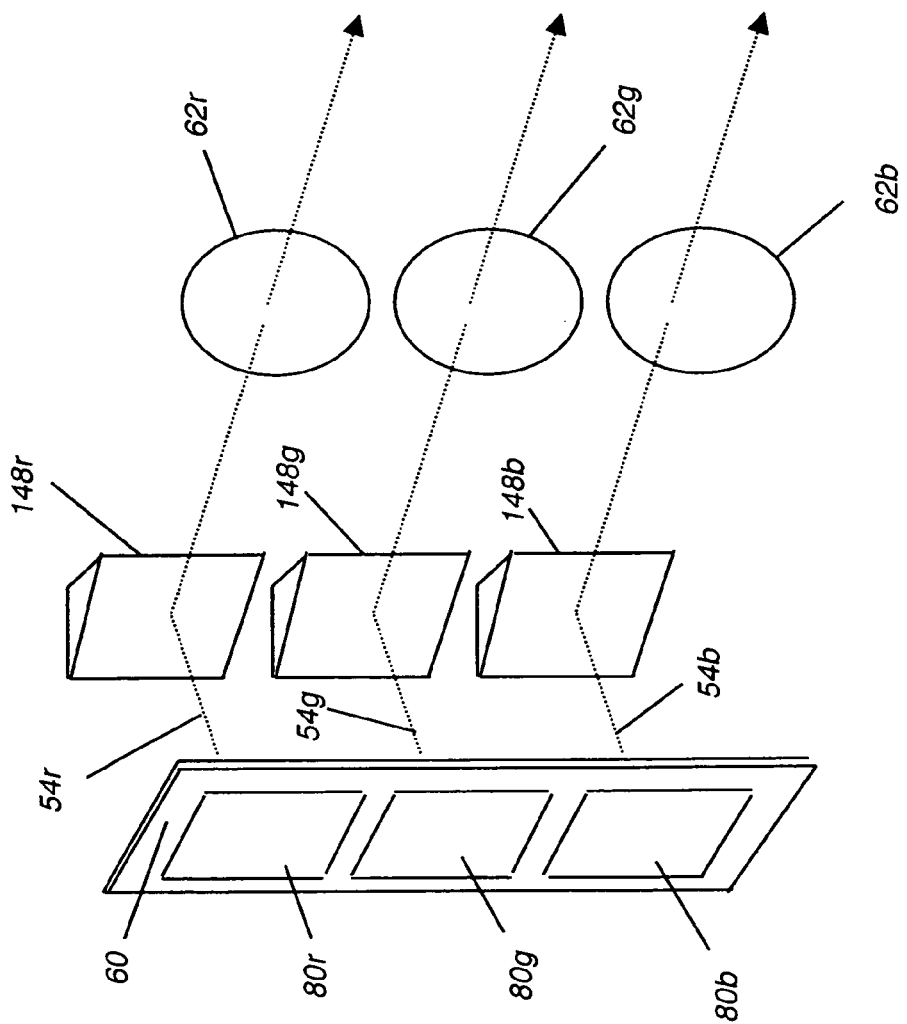
FIG. 12 is a schematic diagram, in perspective, showing an alternate embodiment using a polarization beamsplitter in each color channel.

In an alternate embodiment, as shown in the block diagram of a portion of a projection apparatus in FIG. 12, shown in perspective for clarity, a polarization beamsplitter 148r, 148g, 148b is provided as an analyzer for each modulated component wavelength beam 54r, 54g, 54b from modulator panel 60. Polarization beamsplitters 148r, 148g, 148b, wire grid polarization beamsplitters in one embodiment, turn the optical path of each component wavelength beam 54r, 54g, 54b. In the embodiment of FIG. 12, projection lenses 62r, 62g, and 62b then form an image on display surface 40. In another alternate embodiment, an intermediate image could be formed, as was described above.

Figure 13:
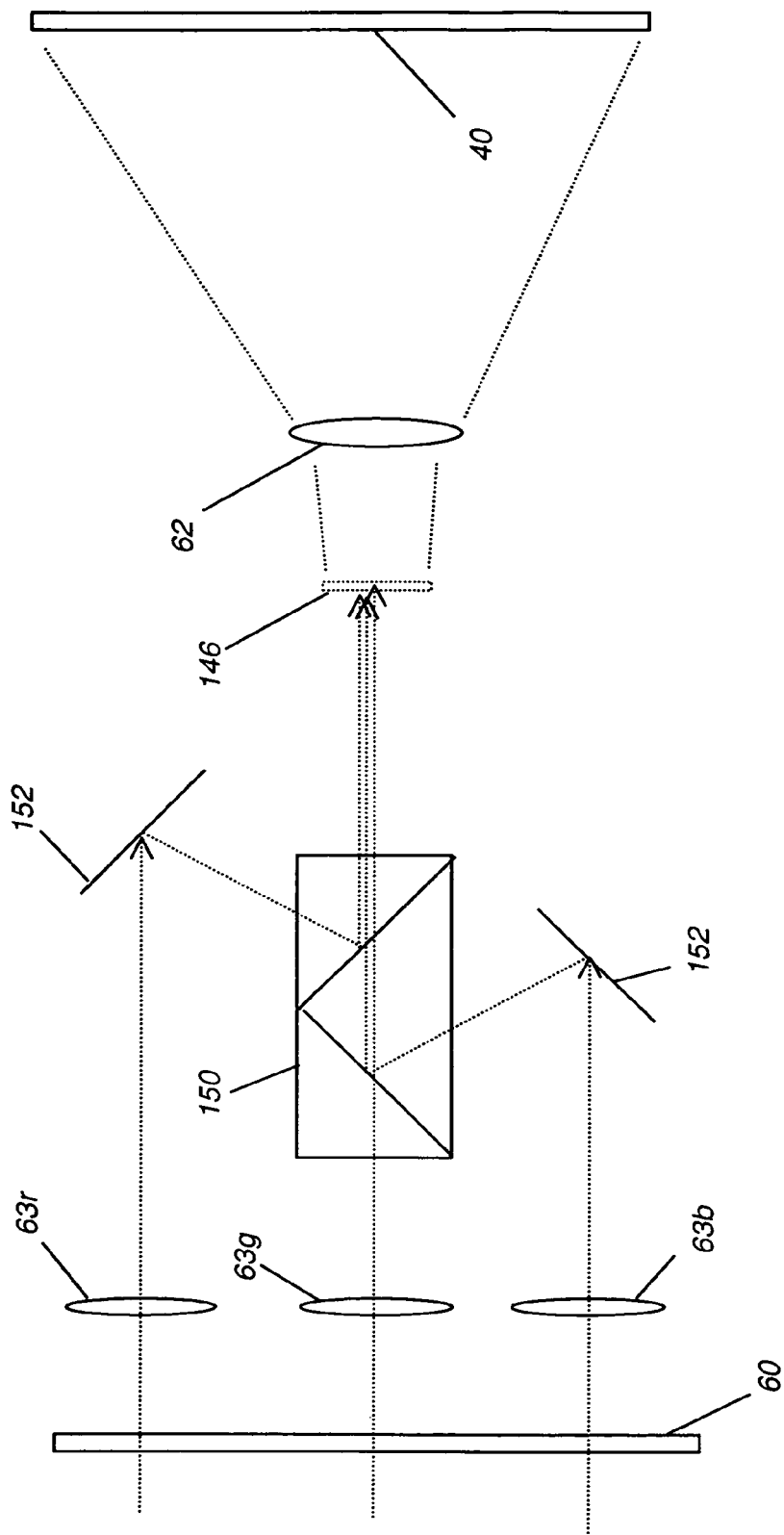
FIG. 13 is a schematic block diagram showing an alternate embodiment of a portion of a color projection apparatus using a V-prism as color combiner for modulated light.

Referring to FIG. 13, there is shown a schematic block diagram of an alternate embodiment in which modulated light from each color channel is directed by lens 63r, 63g, 63b to a V-prism assembly 150. V-prism assembly 150 combines the modulated light onto a single optical path for forming an intermediate image 146 at the pupil of projection lens 62. V-prism assembly 150 is one type of color combiner using dichroic surfaces and working in combination with mirrors 152 to direct light toward projection lens 62. Commonly-assigned U.S. Pat. No. 6,676,260 (Cobb et al.) describes V-prism use in projection apparatus.

Where polarization beamsplitters 148r, 148g, 148b in FIG. 12 are wire grid polarization beamsplitters, such as those provided by Moxtek, Inc., rotation of one of these devices about the optical axis can be used to provide a measure of compensation, using methods disclosed in commonly-assigned U.S. Pat. No. 6,805,445 (Silverstein et al.)

Figure 1:
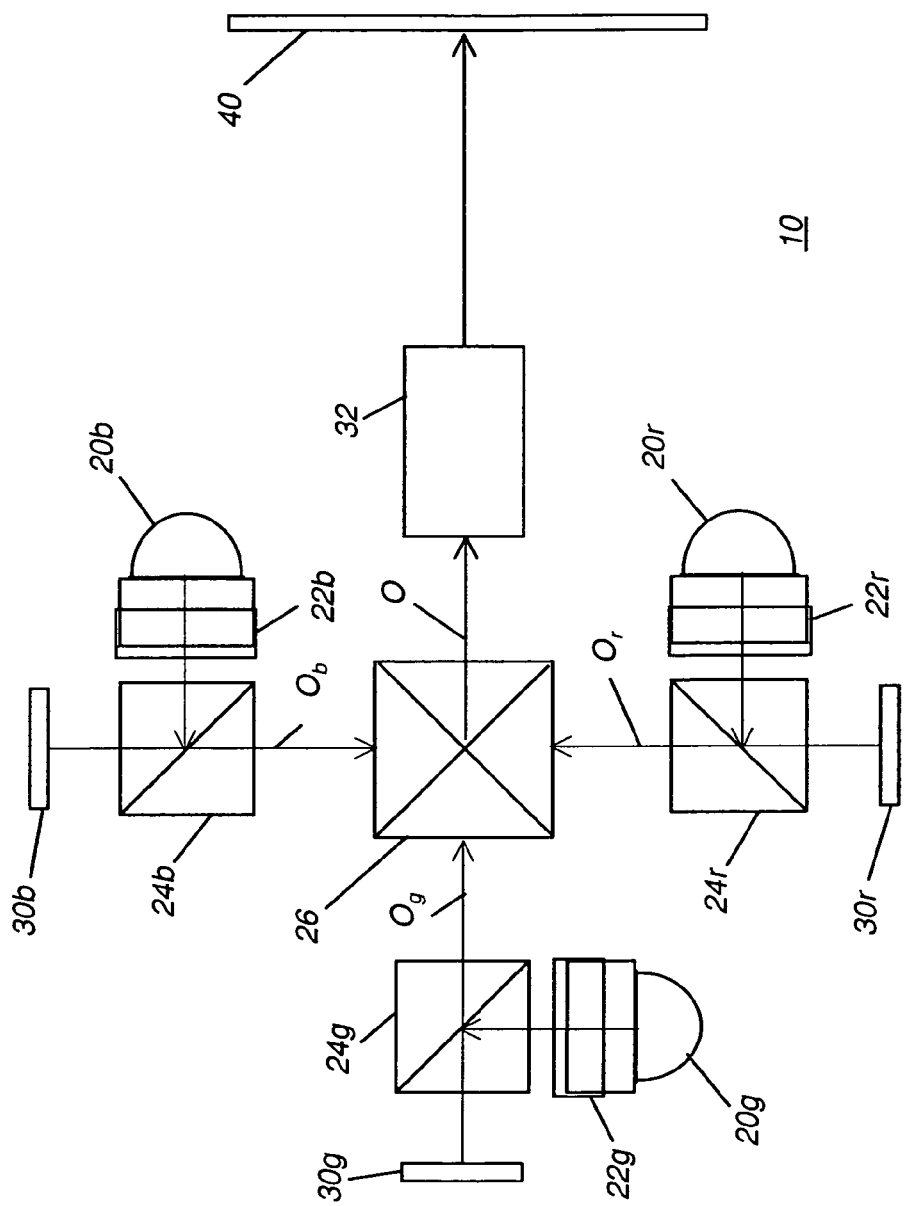
FIG. 1 is a block diagram showing a conventional projection apparatus using LCOS LCD devices.

By comparison with conventional electronic display devices, stereoscopic imaging apparatus 200 of the present invention provides high brightness levels. Where spatial light modulators 30r, 30g, and 30b of the conventional arrangement in FIG. 1 are miniaturized LCOS LC devices, the LaGrange invariant and energy-carrying capacity of these devices constrains the amount of brightness that is available to a range from about 5,000 to no more than about 25,000 lumens. In contrast, the embodiment of FIG. 4 enjoys an expanded luminance range, allowing projection in excess of 30,000 lumens per channel.

The dimensions of LC modulator panel 60 can be optimized to suit the performance requirements of stereoscopic imaging apparatus 200. In contrast to the miniaturized LCOS LCD solutions previously used, LC modulator panel 60 can be a large scale device larger than typical laptop displays, up to 17-20 diagonal inches or more. Although early LC panels were disappointingly slow, ongoing work has provided speed improvements of 100% and better and it appears that increased speeds are feasible. Improved response times of 8 msec or shorter have been reported. Ideally, modulator panel 60 can be sized just big enough such that the full lamp system efficiency can be utilized and small enough to give the fastest response time, with the optimum size for pixel structure and electronics to be fabricated utilizing standard TFT panel methods. Preferably, liquid crystal modulator panel 60 has at least a minimum diagonal of 5 inches. This larger size helps to maximize light throughput and to maximize resolution of the displayed image.

Sizing a TFT panel to be best suited to the lamp system efficiency involves a number of considerations. For example, to utilize a Cermax style lamp with a 2.0 mm arc gap, measurements show that the full efficiency of the lamp can be captured by a system having a LaGrange invariant, defined as the product of the numerical aperture times the diagonal of the modulator area, of approximately 10. A system designed at f/10.0 has numerical aperture (NA) equal to 0.05. Thus, the device diagonal would need to be 200 mm. This value would need to be doubled in order to capture both polarization states. Additionally this modulation area would be required for each wavelength band chosen. Thus, from a system efficiency standpoint, a panel that is slightly larger than 1074×358 mm would be very efficient and offer the best potential for fast transition times. The main difficulty would be to fabricate pixel electronics to be small enough to accommodate this size at the high resolutions desired: 2048×1024 or 4096×2048 for each wavelength band modulated. The preferred embodiment of the stereoscopic imaging apparatus 200 can be made such that each orthogonal polarization state can be placed on separate modulator panels 60 fabricated to this optimal size.

With its capability for using brighter light sources and use of a large-area image generator, stereoscopic imaging apparatus 200 using TFT LC modulator panel 60 as in FIG. 4 offers an overall efficiency on the order of 40-50%. This is in contrast to the typical efficiency of earlier LCOS LCD designs of FIG. 1, where efficiencies of no more than about 5 to 10% are common. Wire grid polarizers are particularly advantageous, since they exhibit relatively low light absorption. In general, a polarizer having light absorption of less than about 20% would be preferred. There may also be improved performance obtained by orienting the wire grid surface itself toward modulator panel 60 in the embodiments described above.

Figure 14:
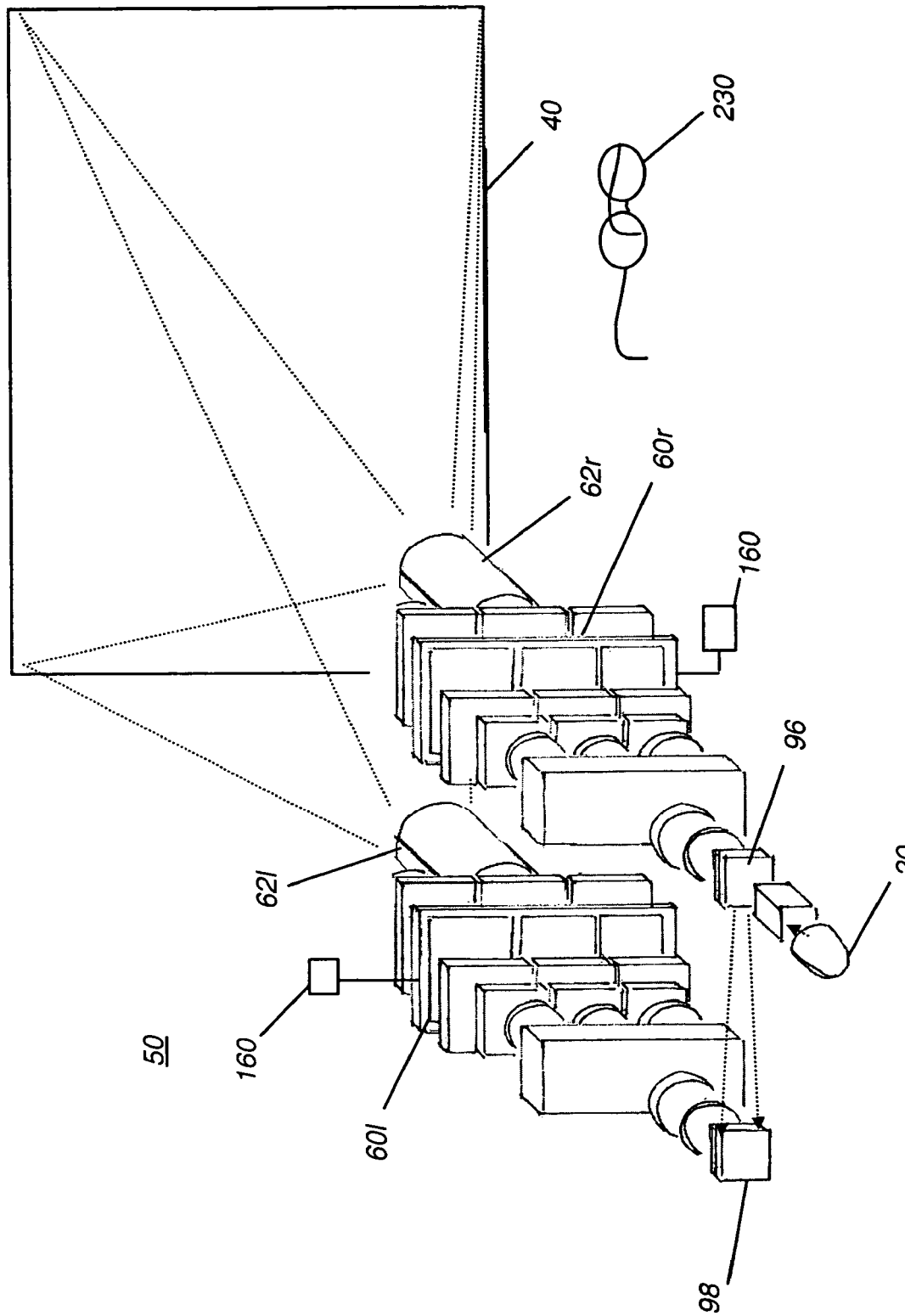
FIG. 14 is a schematic block diagram showing an embodiment using dither to enhance pixel fill factor.
Figure 15:
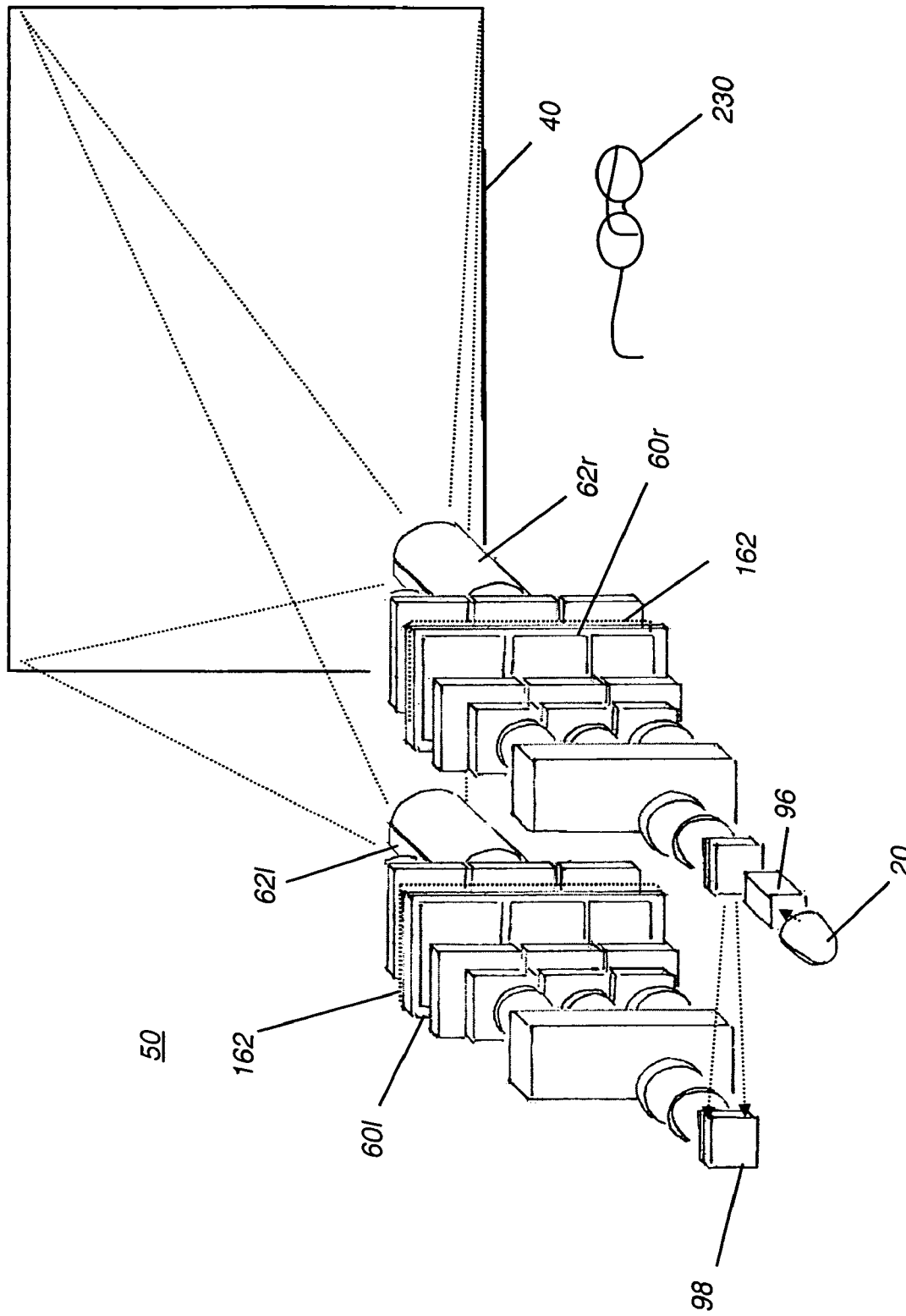
FIG. 15 is a schematic block diagram showing the an embodiment using a blur filter to enhance pixel fill factor.

With stereoscopic imaging apparatus 200, as well as with any imaging apparatus that employs TFT LC modulator panels 60, there may be a need to increase the apparent resolution of output pixels in the image that is displayed or to compensate for edge effects between pixels. Referring to FIGS. 14 and 15, there are shown two different solutions for addressing this problem, not only for stereoscopic imaging apparatus 200, but also for any type of imaging apparatus 50 that uses more than one LC modulator panel 60. In FIG. 14, imaging apparatus 50 uses dithering to improve pixel fill factor and improve the apparent resolution of LC modulator panels 60*l* and 60*r*. Each LC modulator panel 60*l* and 60*r* is mechanically coupled to an actuator 160 that provides dither motion. FIG. 15 shows another alternative, using blur filters 162, shown in dotted lines, for modulated light output from LC modulator panels 60*l* and 60*r*.

Stereoscopic imaging apparatus 200 in the embodiments of FIGS. 14 and 15 can provide twice the pixel count of a non stereoscopic imaging system. The arrangement of FIGS. 14 and 15 can even be used for non stereoscopic image display. For example, with respect to FIG. 14, it is possible to dither one or more of TFT LC modulator panels 60*l*, 60*r* with respect to each other in order to effectively provide a higher resolution image to the viewer. The relative position of the pixels and pixel overlap can be conditioned along with the time period of viewing and the response time of the eye to minimize artifacts due to interpixel gaps and to provide higher display resolution. A feedback control loop, such as that described with reference to FIG. 9, could alternately be employed to monitor and correct for dithering problems.

Figure 16:
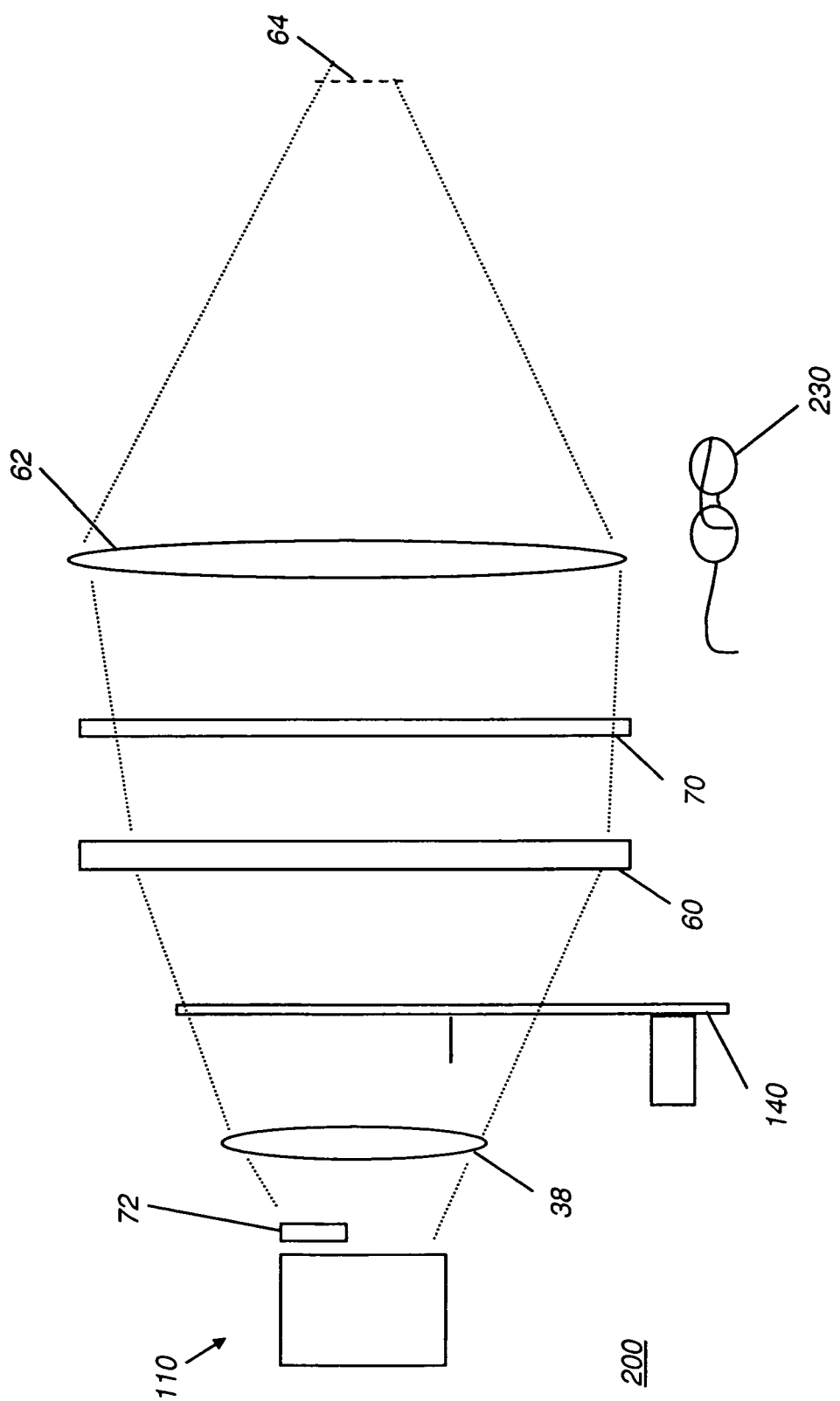
FIG. 16 is a schematic block diagram of an imaging apparatus in an alternate embodiment showing a switchable polarization rotating element.

Another alternate embodiment of stereoscopic imaging system 200 is shown in FIG. 16. Here, a switchable polarization rotating element 70 is employed to switch polarization states rapidly, alternating between left- and right-eye polarization states at sufficient speed in cooperation with images formed on modulator panel 60 that, in turn, cooperates with color scrolling element 140. A half-wave plate 72 is used to change the polarization state of a portion of the light from light providing apparatus 110. For example, an electrically induced retarder, such as a switchable liquid crystal retarder could be used as switchable polarization rotating element 70. Alternately, a rotating half-wave plate could be used. Of course, for this embodiment, switching times of modulator panel 60 must be fast enough for eye response. This same type of polarization switching could provide alternating left- and right-eye images for stereoscopic viewing when used with other light modulation arrangements as well as with color scrolling element 140. For example, with reference back to FIG. 4, a single modulator panel 60 and color separator 78, such as the dichroic color separator shown, could be used to provide stereoscopic imaging with polarization rotating element 70, added at or near the position of image 64. Thus, the modulation components shown as left channel modulation apparatus 2201 in FIG. 4 could be easily adapted, with the addition of polarization rotating element 70 at or near the position of image 64, for alternately providing left- and right-eye images to a viewer. The embodiment of imaging apparatus 50 in FIG. 10, with an individual light source 46*r*, 46*g*, or 46*b* for each color channel, could also be adapted for stereoscopic viewing in a similar manner, with the addition of polarization rotating element 70 at or near the position of image 64.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the embodiments described hereinabove can be used to form an intermediate image or to provide color modulated beams that are separately projected onto display surface 40. Alternative types of more recently introduced TFT components are possible, including organic thin-film transistors (OTFTs) based on conjugated polymers, oligomers, or other molecules and thin film transistors utilizing monolayers of well-dispersed single wall carbon nanotubes.

Thus, what is provided is an apparatus and method for a stereoscopic display apparatus using one or more TFT LC panels for forming the displayed image.

PARTS LIST 10 projection apparatus
20 light source
20r light source, red
20g light source, green
20b light source, blue
22 uniformizing element
22r uniformizing element, red
22g uniformizing element, green
22b uniformizing element, blue
24r polarizing beamsplitter, red
24g polarizing beamsplitter, green
24b polarizing beamsplitter, blue
26 dichroic combiner
30r spatial light modulator, red
30g spatial light modulator, green
30b spatial light modulator, blue
32 projection lens
34 lens
38 lens
40 display surface
42r condensing lens, red
42g condensing lens, green
42b condensing lens, blue
44r illumination path, red
44g illumination path, green
44b illumination path, blue
46r light source, red
46g light source, green
46b light source, blue
48r polarizer, red
48g polarizer, green
48b polarizer, blue
50 imaging apparatus
52r Fresnel lens, red
52g Fresnel lens, green
52b Fresnel lens, blue
53r Fresnel lens, red
53g Fresnel lens, green
53b Fresnel lens, blue
54c component wavelength beam
54d component wavelength beam
54r component wavelength beam, red
54g component wavelength beam, green
54b component wavelength beam, blue
56r analyzer, red
56g analyzer, green
56b analyzer, blue
60 modulator panel
60l modulator panel
60r modulator panel
61r lens, red
61g lens, green
61b lens, blue
62 projection lens
62l projection lens
62r projection lens
63r lens, red
63g lens, green
63b lens, blue
64 image
66 polarized illumination beam
68 illumination section
70 switchable polarization rotating element
72 half-wave plate
76 uniformized polarized beam
78 color separator
80r red component modulating section
80g green component modulating section
80b blue component modulating section
82r border portion, red
82g border portion, green
82b border portion, blue
84a light blocking segment
84b light blocking segment
90a dichroic surface
90b dichroic surface
92 turning mirror
96 polarizer
98 mirror
100 control loop
102r actuator, red
102g actuator, green
102b actuator, blue
104 sensor
106 target
108 control logic processor
110 polarized light providing apparatus
114r component wavelength modulating section, red
114g component wavelength modulating section, green
114b component wavelength modulating section, blue
116 shutter
118 LC modulator panel
120 LC material
122 thin-film transistor (TFT)
124 ITO layer
126 glass
128 polarizer
130 compensation film
132 color filter array
134 antireflection coating
136 antireflection coating
140 color scrolling element
140l color scrolling element
140r color scrolling element
142 line
144l illumination path
144r illumination path
146 intermediate image
148 polarization beamsplitter
148r polarization beamsplitter, red
148g polarization beamsplitter, green
148b polarization beamsplitter, blue
150 V-prism assembly
152 mirror
162 blur filter
200 stereoscopic imaging apparatus
210 illumination source
220l channel modulation apparatus
220r channel modulation apparatus
230 channel differentiator device

The invention claimed is:

1. A stereoscopic imaging apparatus comprising:
a) an illumination source providing a first polarized illumination beam for a left eye imaging channel and a second polarized illumination beam for a right eye imaging channel, wherein the illumination source comprises at least one uniformizing element for uniformizing the first and second illumination beams;

b) a left channel modulation apparatus for modulating the first polarized illumination beam to provide the left eye portion of a stereoscopic image and a right channel modulation apparatus for modulating the second polarized illumination beam to provide the right eye portion of the stereoscopic image, wherein each channel modulation apparatus further comprises:
  i) a color separator for separating the polarized illumination beam into at least a first component wavelength illumination and a second component wavelength illumination;
  ii) at least two component wavelength modulating sections, each component wavelength modulating section accepting a corresponding component wavelength illumination and modulating the component wavelength illumination to provide a modulated component wavelength beam, each component wavelength modulating section comprising:
    a portion of a monochrome transmissive liquid crystal modulator panel that has been segmented into at least a first portion and a second portion, and wherein each portion is spatially separated from each other portion;
    an illumination path lens for focusing the corresponding component wavelength illumination through the corresponding portion of the monochrome transmissive liquid crystal modulator panel;
    an analyzer for further conditioning the polarization of the modulated component wavelength beam;
c) at least one projection lens for forming, onto a display surface, a composite image that superimposes an image formed from the modulated component wavelength beam of the left channel modulation apparatus with the image formed from the modulated component wavelength beam of the right channel modulation apparatus; and
d) a channel differentiator device provided to a viewer for separating the left eye portion and right eye portion of the stereoscopic image.

2. The projection apparatus according to claim 1 wherein the at least two component wavelength modulating sections further comprise a lens for forming the image formed from the modulated component wavelength beam of the left channel modulation apparatus and the image formed from the modulated component wavelength beam of the right channel modulation apparatus as an intermediate image for projection by the projection lens.

3. The projection apparatus according to claim 1 wherein the illumination path lens is taken from a group consisting of a Fresnel lens and a holographic lens.

4. The projection apparatus according to claim 1 wherein the illumination source comprises a light source taken from a group consisting of an LED, an LED array, a Xenon lamp, and a Mercury lamp.

5. The projection apparatus according to claim 1 wherein the uniformizing element comprises a lenslet array.

6. The projection apparatus according to claim 1 wherein the uniformizing element comprises an integrating bar.

7. The projection apparatus according to claim 1 wherein the transmissive liquid crystal modulator comprises thin film transistors.

8. The projection apparatus according to claim 1 wherein the transmissive liquid crystal modulator has a diagonal dimension of at least five inches.

9. The projection apparatus according to claim 7 wherein the thin film transistors are organic thin film transistors.

10. The projection apparatus according to claim 7 wherein the thin film transistors comprise carbon nanotubes.

11. The projection apparatus according to claim 1 wherein at least one component wavelength polarizer is spaced apart from the monochrome transmissive liquid crystal modulator panel.

12. The projection apparatus according to claim 1 wherein the polarizer is a wire grid polarizer.

13. The projection apparatus according to claim 12 wherein the wire surface side of the wire grid polarizer device is oriented toward the liquid crystal modulator panel.

14. The projection apparatus according to claim 1 wherein at least one analyzer is a wire grid polarizer device.

15. The projection apparatus according to claim 14 wherein the wire surface side of the wire grid polarizer device is oriented toward the liquid crystal modulator panel.

16. The projection apparatus according to claim 1 wherein at least one illumination path lens is a Fresnel lens spaced apart from the monochrome transmissive liquid crystal modulator panel.

17. The projection apparatus according to claim 1 wherein at least one illumination path lens is a holographic lens spaced apart from the monochrome transmissive liquid crystal modulator panel.

18. The projection apparatus according to claim 1 further comprising
  a) a sensor for detecting an offset in the superimposed image between the image formed from the modulated component wavelength beam of the left channel modulation apparatus and the image formed from the modulated component wavelength beam of the right channel modulation apparatus; and
  b) an imaging control processor for shifting the position of at least one of the first or second portions on the monochrome transmissive liquid crystal modulator to compensate for the offset.

19. The projection apparatus according to claim 1 further comprising
  a) a sensor for detecting an offset in the superimposed image between the image formed from the modulated component wavelength beam of the left channel modulation apparatus and the image formed from the modulated component wavelength beam of the right channel modulation apparatus; and
  b) an actuator coupled with the at least one projection lens for adjusting lens position to compensate for the offset.

20. The projection apparatus according to claim 19 wherein the sensor information is used to improve the image resolution.

21. The projection apparatus according to claim 1 wherein at least one of the component wavelength modulating sections further comprises a modulated beam Fresnel lens.

22. The projection apparatus according to claim 1 wherein at least one of The component wavelength modulating sections further comprises a modulated beam holographic lens.

23. The projection apparatus according to claim 21 wherein the modulated beam Fresnel lens is glass.

24. The projection apparatus according to claim 21 wherein the modulated beam Fresnel lens comprises crossed cylindrical Fresnel lenses.

25. The projection apparatus according to claim 1 wherein the analyzer in at least one component wavelength modulating section comprises a wire grid polarization beamsplitter.

26. The projection apparatus according to claim 1 wherein the illumination source further comprises a shutter 27. The projection apparatus according to claim 1 further comprising a compensator.

28. The projection apparatus according to claim 27 wherein the compensator is placed between the modulator panel and the at least one component wavelength polarizer.

29. The projection apparatus according to claim 27 wherein the compensator is a film-based component.

30. The projection apparatus according to claim 27 wherein the compensator is a multi-dielectric thin film stack based component.

31. The projection apparatus according to claim 27 wherein the compensator is in the path of the first component wavelength illumination.

32. The projection apparatus according to claim 27 wherein the compensator is in the path of a modulated component wavelength beam.

33. The projection apparatus according to claim 1 wherein the analyzer is spaced apart from the liquid crystal modulator panel.

34. The projection apparatus according to claim 1 wherein at least one analyzer is a reflective polarizing beamsplitter.

35. The projection apparatus according to claim 27 wherein the compensator comprises a formed birefringent structure.

36. The projection apparatus according to claim 1 wherein the first and second component wavelength illumination are selected from the group consisting of red, green, and blue illumination.

37. The projection apparatus according to claim 1 wherein the at least two modulated component wavelength beams form an intermediate image for projection by a projection lens.

38. The projection apparatus according to claim 1 wherein the monochrome transmissive liquid crystal modulator panel has a first antireflection coating on a first surface and a second antireflection coating on a second surface.

39. The projection apparatus according to claim 1 further comprising a color combiner to combine modulated component wavelength beams for projection.

40. The projection apparatus according to claim 1 wherein the first illumination beam is orthogonally polarized relative to the second illumination beam.

41. The projection apparatus according to claim 1 wherein the first illumination beam has a different spectral profile than the second illumination beam.

42. The projection apparatus according to claim 1 wherein the channel differentiator device separates the left and right eye portions according to their respective transmissive spectral profiles.

43. The projection apparatus according to claim 41 wherein the spectral profile of the first illumination beam comprises red, green, and blue wavelengths and the spectral profile of the second illumination beam comprises yellow, magenta, and cyan spectral profiles.

44. An imaging apparatus comprising:
a) an illumination section providing a first uniformized, polarized illumination beam of multiple wavelengths and a second uniformized, polarized illumination beam of multiple wavelengths;
b) a first component wavelength modulating section for modulating the first uniformized, polarized illumination beam of multiple wavelengths and a second component wavelength modulating section for modulating the second uniformized, polarized illumination beam of multiple wavelengths, each component wavelength modulating section comprising:
i) a color separator for separating the corresponding uniformized, polarized beam of multiple wavelengths into at least a first component wavelength illumination and a second component wavelength illumination;
ii) at least a portion of a monochrome transmissive liquid crystal modulator panel for forming a modulated beam from an incident light;
iii) an illumination path lens for directing at least the first and second component wavelength illumination to the portion of the monochrome transmissive liquid crystal modulator panel as the incident light;
iv) a lens for directing the modulated beam from the monochrome transmissive liquid crystal modulator panel toward at least one projection lens;
whereby the at least one projection lens forms an image on a display surface.

45. The imaging apparatus of claim 44 wherein at least one of the first and second component wavelength modulating sections further comprise a dithering actuator for increasing the resolution of the image formed on the display surface.

46. A method for forming an image on a display surface comprising:
a) providing a first uniformized, polarized illumination beam of multiple wavelengths and a second uniformized, polarized illumination beam of multiple wavelengths;
b) modulating the first uniformized, polarized illumination beam of multiple wavelengths at a first component wavelength modulating section and modulating the second uniformized, polarized illumination beam of multiple wavelengths at a second component wavelength modulating section, each component wavelength modulating section comprising:
i) a color separator for separating the corresponding uniformized, polarized beam of multiple wavelengths into at least a first component wavelength illumination and a second component wavelength illumination;
ii) at least a portion of a monochrome transmissive liquid crystal modulator panel for forming a modulated beam from an incident light;
iii) an illumination pat lens for directing at least the first and second component wavelength illumination to the portion of the monochrome transmissive liquid crystal modulator panel as the incident light;
iv) a lens for directing the modulated beam from the monochrome transmissive liquid crystal modulator panel toward at least one projection lens; and
c) forming an image from the modulated beams from the first and second component wavelength modulating sections on a display surface.

47. A stereoscopic imaging apparatus comprising:
a) an illumination source providing a first illumination beam for a left eye imaging channel and a second illumination beam for a right eye imaging channel;
b) a left channel modulation apparatus for modulating the first illumination beam to provide the left eye portion of the stereoscopic image and a right channel modulation apparatus for modulating the second illumination beam to provide the right eye portion of the stereoscopic image, wherein each channel modulation apparatus further comprises:
i) a uniformizing element for conditioning the illumination beam to provide a uniformized beam;
ii) a color separator for separating the uniformized beam into at least a first component wavelength illumination and a second component wavelength illumination;

iii) at least two component wavelength modulating sections, each component wavelength modulating section accepting a corresponding component wavelength illumination and modulating the component wavelength illumination to provide a modulated component wavelength beam, each component wavelength modulating section comprising:

a portion of a monochrome transmissive liquid crystal modulator panel that has been segmented into at least a first portion and a second portion, and wherein each portion is spatially separated from each other portion;

a component wavelength polarizer in the path of the component wavelength illumination for directing substantially polarized light to the corresponding portion of the monochrome transmissive liquid crystal modulator panel;

an illumination path lens for focusing incident illumination from the component wavelength polarizer through the corresponding portion of the monochrome transmissive liquid crystal modulator panel;

an analyzer for conditioning the polarization of the modulated component wavelength beam; and, a lens for forming an intermediate image from modulated light;

c) a projection lens for forming, onto a display surface, a composite image that superimposes the intermediate image formed by the left channel modulation apparatus with the intermediate image formed by the right channel modulation apparatus; and d) a channel differentiator device provided to each viewer for separating the left eye portion and right eye portion of the stereoscopic image.

48. A method for displaying a stereoscopic image comprising:

a) providing a uniformized, polarized illumination beam;

b) conditioning the uniformized, polarized illumination beam to provide a repeating sequence of at least two color illumination beams;

c) modulating the at least two color illumination beams to provide corresponding modulated color beams;

d) switching the orientation of a polarization transmission axis repeatedly between two polarization states to provide the modulated color beams in alternating polarization states;

e) directing the modulated color beams toward a display surface to form a projected image having alternating polarization states; and f) providing a channel differentiator device to a viewer for separating the alternating polarization states to provide one polarization state for viewing from the left eye and the other polarization state for viewing from the right eye.

* * * * *